(12) United States Patent
Xiao et al.

(10) Patent No.: US 12,498,010 B2
(45) Date of Patent: Dec. 16, 2025

(54) DAMPING SHOCK ABSORBER AND VIBRATION REDUCTION DESIGN METHOD

(71) Applicant: XIAMEN ZHEN-WEI TECHNOLOGY CO., LTD, Xiamen (CN)

(72) Inventors: Wangqiang Xiao, Xiamen (CN); Qibin Liu, Xiamen (CN)

(73) Assignee: XIAMEN ZHEN-WEI TECHNOLOGY CO., LTD, Xiamen (CN)

( * ) Notice: Subject to any disclaimer, the term of this patent is extended or adjusted under 35 U.S.C. 154(b) by 406 days.

(21) Appl. No.: 18/098,118

(22) Filed: Jan. 18, 2023

(65) Prior Publication Data

US 2023/0151870 A1    May 18, 2023

Related U.S. Application Data

(63) Continuation of application No. PCT/CN2021/132642, filed on Nov. 24, 2021.

(30) Foreign Application Priority Data

Feb. 3, 2021   (CN) .......................... 202110147225.X
Feb. 3, 2021   (CN) .......................... 202110147230.0

(51) Int. Cl.
*F16F 7/01* (2006.01)
*F16F 15/02* (2006.01)
(Continued)

(52) U.S. Cl.
CPC ................ *F16F 7/01* (2013.01); *F16F 15/02* (2013.01); *G06F 30/18* (2020.01); *G06F 30/23* (2020.01);
(Continued)

(58) Field of Classification Search
CPC .................................... F16F 7/01; F16F 7/015
See application file for complete search history.

(56) References Cited

U.S. PATENT DOCUMENTS 2,417,347 A * 3/1947 Brown ...................... F16F 7/01
                                                    188/322.5
5,820,348 A * 10/1998 Fricke .................... F16F 15/10
                                                    416/500
(Continued)

FOREIGN PATENT DOCUMENTS

CN       108050337 A  *  5/2018
CN       110641082 A  *  1/2020
(Continued)

OTHER PUBLICATIONS

International Search Report issued in corresponding international application No. PCT/CN2021/132642, mailed Feb. 22, 2022.
(Continued)

*Primary Examiner* — Robert A. Siconolfi

(57) ABSTRACT

A damping shock absorber includes a pipe and a plurality of shock absorbers configured on the pipe. The shock absorber includes a main body sleeved on the outer periphery of the pipe and a damping medium filled in the main body. The main body is provided with an inner cavity, and the inner cavity is divided into a plurality of chambers for placing the damping medium separately. A method for designing the damping shock absorber, wherein the main body is filled with the damping medium, such that the shock of the pipe or a shaft body is reduced, ensuring the smooth operation of the pipe or the shaft body, and further ensuring the safety and efficiency of the pipe or the shaft body in a working process. The damage to the pipe or the shaft body and the shock interference to other linked apparatuses are greatly avoided.

13 Claims, 19 Drawing Sheets

(51) Int. Cl.
    *G06F 30/18*     (2020.01)
    *G06F 30/23*     (2020.01)
    *G06F 119/14*     (2020.01)

(52) U.S. Cl.
    CPC ....... *F16F 2222/04* (2013.01); *G06F 2119/14* (2020.01)

(56) References Cited

U.S. PATENT DOCUMENTS

| | | | | |
|---|---|---|---|---|
| 6,224,341 | B1* | 5/2001 | Fricke | F16F 15/363 416/500 |
| 2014/0138196 | A1* | 5/2014 | Mazzucchelli | B65D 81/051 188/268 |
| 2017/0322602 | A1 | 11/2017 | Tan | |
| 2017/0335915 | A1* | 11/2017 | Nyboer | F16F 15/366 |
| 2020/0284314 | A1* | 9/2020 | Catanzarite | F16F 15/021 |
| 2021/0381579 | A1* | 12/2021 | Wu | F16F 15/366 |
| 2023/0151870 | A1* | 5/2023 | Xiao | F16F 7/01 188/268 |

FOREIGN PATENT DOCUMENTS

| | | | | |
|---|---|---|---|---|
| CN | 113153947 | A * | 7/2021 | ............. F16F 15/02 |
| CN | 113158507 | A | 7/2021 | |
| CN | 214465831 | U | 10/2021 | |
| CN | 214618470 | U | 11/2021 | |
| CN | 214618471 | U | 11/2021 | |
| CN | 214618472 | U | 11/2021 | |
| CN | 116776686 | A * | 9/2023 | |
| EP | 1060970 | A1 * | 12/2000 | ............. B60G 13/16 |

OTHER PUBLICATIONS

Written Opinion of the International Searching Authority for No. PCT/CN2021/132642.

* cited by examiner

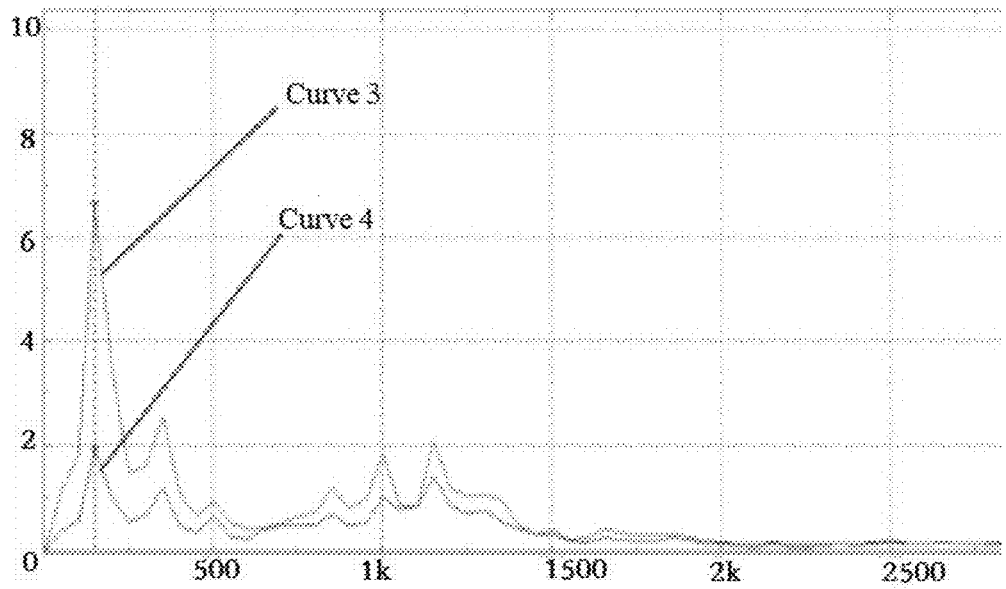

FIG. 11 performing vibration test for the piping system to be treated in a working state to determine a main frequency band of a vibration distribution and a frequency range of a sweep test of the piping system; — S101 performing a modal dynamics simulation of an established piping system model according to a type of the piping system to obtain a modal mode shape of the piping system; — S102 determining an installation position of a shock absorber model in the piping system model according to the obtained main frequency band of the vibration distribution of the piping system and the modal mode shape of the piping system, and setting the shock absorber model in the installation position to obtain a vibration damping system model; — S103 performing simulation on the vibration damping system model by finite element and discrete element coupling according to the frequency range of the sweep test to determine an optimal value of each configuration parameter of the shock absorber model, and designing vibration reduction based on the optimal value of the configuration parameter — S104

FIG. 12

DAMPING SHOCK ABSORBER AND VIBRATION REDUCTION DESIGN METHOD

CROSS-REFERENCE TO RELATED PATENT APPLICATIONS

This application is a continuation-application of International Application No. PCT/CN2021/132642, with an international filing date of Nov. 24, 2021, the contents of all of which are hereby incorporated by reference.

TECHNICAL FIELD

The present disclosure relates to the field of vibration damping technology, in particular, to a damping shock absorber and a vibration reduction design method.

BACKGROUND

Vibration reduction methods include active vibration control and passive vibration control, in industry or engineering, the passive vibration control is most commonly used. Among them, the passive vibration control is usually realized by improving the support stiffness, taking vibration isolation measures and installing shock absorbers. Such as increasing the number of supports, reasonably arranging the positions of the supports, increasing the volume of the support seat to improve the rigidity of the pipeline, arranging vibration isolation components such as rubber pads and spring mount vibration isolator at the support to isolate vibration source and reduce vibration propagation, installing shock absorbers on the pipeline, absorbing the vibration generated by the pipeline to reduce vibration propagation, etc. In the shafting transmission system, the shaft body used for transmission needs to move back and forth or rotate to drive the terminal equipment to run. In order to meet the requirements of mobility and flexibility, high-speed shafting is usually used to form a multi-degree-of-freedom vibration environment. Due to factors such as the manufacturing accuracy and installation error of the shaft body, when the shaft body moves or rotates to transmit torque, under the action of the power supply of the power source, vibration phenomenon occurs inevitably, which will affect the work and use.

Technical Issues

In practical applications, there is no way to let the measures of the passive control, including improving the stiffness of the pipeline support, taking vibration isolation measures and installing shock absorbers, work collectively. Although increasing the pipe support can improve the pipeline stiffness and reduce the pipeline vibration, it can also establish coupling with the surrounding pipeline, making it easier to spread the vibration to the use scenario. The use of vibration isolation measures can reduce the propagation of pipeline vibration to the use scenario, but it cannot solve the problem of large vibration of the pipeline itself. Although the installation of shock absorbers can absorb the vibration generated by the pipeline, it cannot improve the support stiffness of the pipeline. There is currently no systematic method to use the shock absorber in combination with other measures, and if such combination does not work well, the effect of the shock absorber may be suppressed and the pipeline vibration may be amplified.

Technical Solutions

One object of the present disclosure is to provide a damping shock absorber and a vibration damping design method which can achieve good vibration damping effect, while avoiding vibration interference to the terminal equipment and power source equipment.

In order to achieve the above technical object and achieve the above technical effect, the present disclosure discloses a damping shock absorber, including a pipe and a plurality of shock absorbers disposed on the pipe, wherein each of the shock absorbers comprises a main body sleeved on an outer periphery of the pipe and a damping medium filled in the main body. The main body is provided with an inner cavity, and the inner cavity is divided into a plurality of chambers for placing the damping medium separately.

Preferably, the damping medium is a granular material, and the granular material with a predetermined amount is packaged by a wrapping to form a damping bag, and a plurality of the damping bag are configured with different filling rates and stacked and placed in the inner cavity.

Preferably, the main body is roughly in the shape of a hoop, and the inner cavity is divided by an isolation member, so as to correspondingly form the mutually independent chambers, wherein the chambers are spaced apart along a direction around the pipe.

Preferably, each of the shock absorbers is connected to an external support bracket, and the external support bracket is vertically arranged between the shock absorber and the mounting plane, so that one end of the external support bracket is connected to one side of the shock absorber, the other end of the external support bracket is configured on the mounting plane. The damping shock absorber further comprises buffer brackets, a plurality of the buffer brackets spaced apart are arranged between different shock absorbers along a pipe laying direction, for supporting the pipe and suspending the pipe above the mounting plane.

Preferably, two end portions of the pipe are respectively connectable to an external pipe fitting, the pipe is a flexible pipe, and the shock absorbers are detachably configured to the end portions of the flexible pipe at positions close to the pipe fitting.

Preferably, two end portions of the pipe are respectively connectable to an external pipe fitting, the pipe is a rigid pipe, and a middle portion of the rigid pipe is detachably configured with at least one of the shock absorbers correspondingly.

An embodiment of the present disclosure further provides a method for designing vibration reduction of a piping system, comprising:

performing vibration test for the piping system to be treated in a working state to determine a main frequency band of a vibration distribution and a frequency range of a sweep test of the piping system;

performing a modal dynamics simulation of an established piping system model according to a type of the piping system to obtain a modal mode shape of the piping system;

determining an installation position of a shock absorber model in the piping system model according to the obtained main frequency band of the vibration distribution of the piping system and the modal mode shape of the piping system, and setting the shock absorber model in the installation position to obtain a vibration damping system model; and performing simulation on the vibration damping system model by finite element and discrete element coupling according to the frequency range of the sweep test to determine an optimal value of each configuration parameter of the shock absorber model, and designing vibration reduction based on the optimal value of the configuration parameter.

In one embodiment of the above scheme, the main body is sleeved around the outer periphery of the pipe and damping medium in filled in the inner cavity, so that the shock absorber sleeved on the pipe A can absorb the vibration generated by the pipe A. As a result, the transmission of vibration can be greatly reduced. The vibration of pipe A can cause flowing, deformation and collision of the damping medium in the inner cavity and form a damping effect, thereby dissipating energy and effectively weakening the vibration of pipe A, and the assembly is convenient, the space occupation is small, and it is conducive to operation and use. In addition, the inner cavity is divided into multiple chambers, and each chamber is placed with the damping medium. On the one hand, the damping medium can be directly filled in the chamber of the inner cavity without excessively increasing the mass and space occupation of the main body. On the other hand, it is ensured that the damping medium can move freely in the respective chamber, so as to avoid the damping failure caused by excessive stacking of the damping medium and to make sure that the shock absorber can have good vibration damping and noise reduction effects in the vibration environment, thereby greatly avoiding the damage of pipe A and interference on other linked equipment.

The present disclosure also discloses a damping shock absorber, comprising a main body sleeved around an outer periphery of a rotary shaft, a plurality of chambers disposed in the main body, and damping particles filled in the chambers, wherein the chambers are disposed in the main body in a regular arrangement.

Preferably, the plurality of chambers are distributed on an outer periphery of the main body, the chambers circumferentially circulate around the outer periphery of the main body and are centrosymmetric. The damping particles contained in each chamber has the same material, particle size and filling rate.

Preferably, the chambers are provided in the main body, and the chambers are spaced with each other and arranged around the outside of the rotary shaft along an axial direction of the rotary shaft. The main body is concave inward from positions near the lateral end surfaces to form chambers that are mutually independent. The chambers are arranged symmetrically along the axial direction of the rotary shaft, and the main body is concave inward from positions near both lateral end surfaces to form the chambers with the same dimension. Among them, at least two layers of the chambers are arranged from the inside out and in an orientation going around the rotary shaft. The chambers of different layers have different sizes, and the chambers of the outer layer have a size greater than that of the chambers of the inner layer. The chambers can accommodate damping particles of different sizes due to different arcs and distances from the inner diameter. The quality is tuned according to the design method, and the damping particle material, particle size and filling rate of the chambers of different internal space are also different.

Preferably, the main body is roughly in the shape of a hoop and is detachably arranged around the rotary shaft. The main body has at least two separable hoop elements, and the hoop elements are connected to each other to form a complete main body. The hoop elements each has an arch bridge shape with hollowed inside, the arch bridge has a side cover plate, the side cover plate can be separated with the hoop element to expose the respective chambers accordingly.

Preferably, the damping particles are granular material, and the granular material with a predetermined quantity is packaged by the wrapping to form a damping bag, and a plurality of the damping bags are stacked and placed in each of the chambers. The damping bags are filled with the granular material with different predetermined quantities, and the chambers are respectively used to accommodate a different number of damping bag. The wrapping is a plastic bag having a cavity for storing the granular material and a sealable opening that can be opened and closed and is an access to the cavity.

According to another embodiment of the present disclosure, a method for designing the above-mentioned damping shock absorber is provided, which comprises:

determining a shape of the shock absorber and a method to fix the shock absorber, wherein the shock absorber consists of two semicircular cavities and a plurality of chambers configured in each of the semicircular cavity, and two semicircular cavities are fastened and fixed on the rotary shaft by bolts in the form of locking the two semicircular cavities to form an enclosed hoop. The chambers are provided with damping particles;

determining design parameters of the shock absorber according to a mass of the rotary shaft and an optimal frequency ratio of a shafting damping system;

determining a number of the chambers of each semicircular cavity and a size of each chamber according to design parameters of the shock absorber;

determining design parameters of the damping particles according to an equation of motion of the damping particles in the cavities of the shock absorber and a contact force model of the damping particles; and designing the shock absorber according to the design parameters of the shock absorber, the size of the chambers of each semicircular cavity and the number of chambers, and the design parameters of the damping particles.

In one embodiment of the above scheme, by configuring the main body filled with damping medium around the outer periphery of the shaft body, the generation of vibration of the shaft body is reduced, ensuring the smooth operation of the shaft body, and further ensuring the safety and efficiency of the shafting transmission system during operation. The shafting transmission system is equipped with shock absorbers, which can offer a good vibration damping effect. Among them, multiple chambers are regularly arranged in the main body and surround around the rotary shaft at intervals along an axial direction to ensure the free movement of the damping medium in their respective chambers and avoid damping failure caused by excessive stacking and interference of the damping medium. Moreover, multiple chambers regularly arranged around the shaft body can absorb the vibration of the active shaft body in multiple directions at the same time, which has good vibration reduction and noise reduction effects, and can greatly avoid the vibration interference on terminal equipment and power source equipment during the transmission process of the shaft body.

Beneficial Effects

According to the present disclosure, the main body is filled with damping medium to reduce the vibration of the pipe or shaft body, which ensures the smooth operation of the pipe or rotary shaft and the safety and efficiency of the pipe or shaft body in the working process, thereby greatly avoiding the damage of the pipe or rotary shaft and the vibration interference on other linked equipment.

BRIEF DESCRIPTION OF THE DRAWINGS

FIG. 11 is a diagram showing the comparison of the vibration damping effect of the shock absorber according to the first embodiment of the present disclosure.

FIG. 12 is a flow chart showing the damping design method of the piping system.

DETAILED DESCRIPTION OF THE EMBODIMENTS

In order to make the purpose, technical solution and advantages of the present disclosure clearer, further details are given below in conjunction with the accompanying drawings and the embodiments.

Embodiment 1

Figure 1:
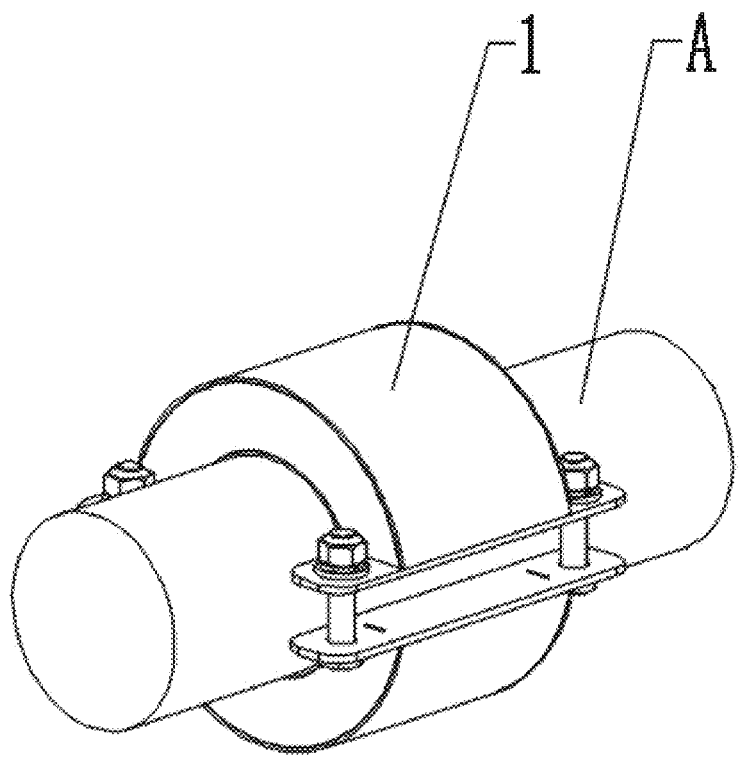
FIG. 1 is a structural schematic diagram of a piping system according to the first embodiment of the present disclosure.
Figure 2:
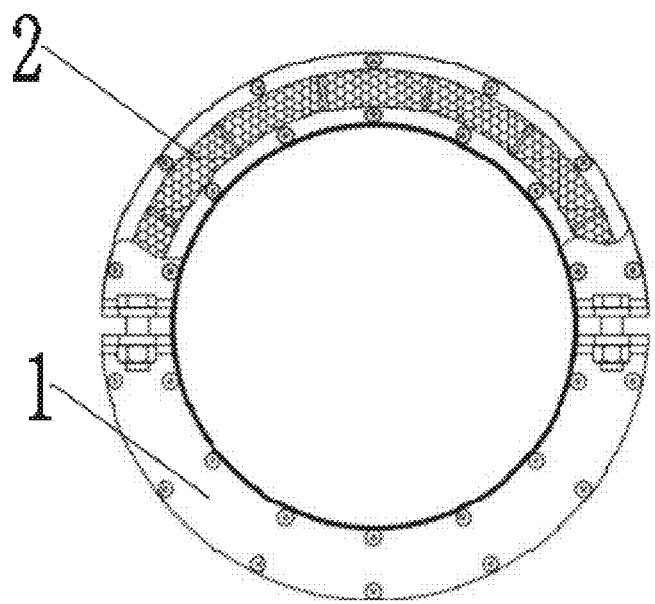
FIG. 2 is a structural schematic diagram of a shock absorber according to the first embodiment of the present disclosure, wherein in order to facilitate illustration, the side covering plate is partially hidden.
Figure 3:
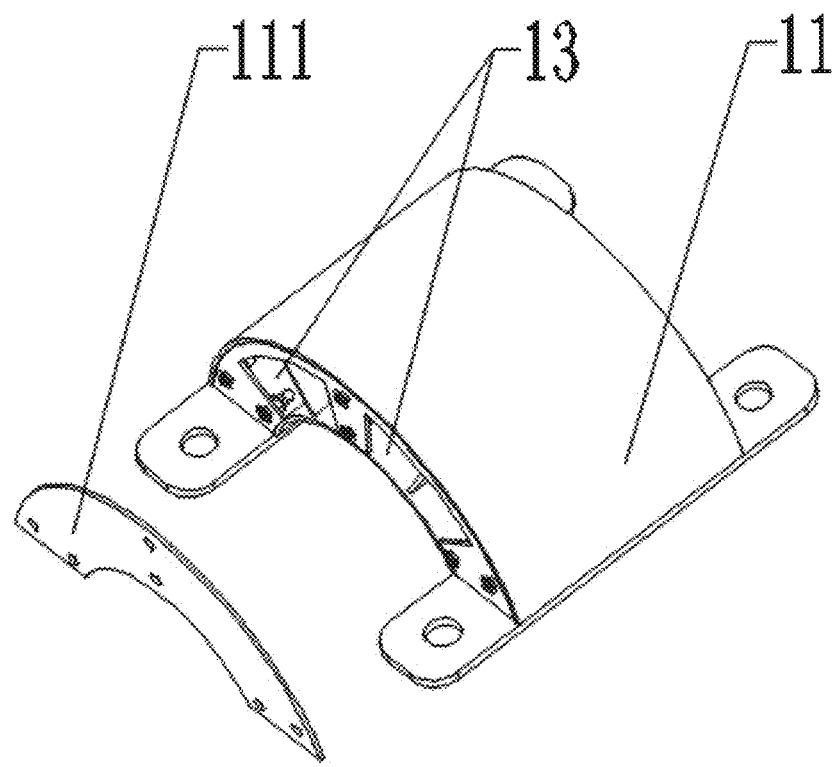
FIG. 3 is a schematic diagram of the partial disassembly of the hoop element of the shock absorber of FIG. 1.

Combined with FIGS. 1 to 3, an embodiment of the present disclosure provides a piping system, including pipe A and a plurality of shock absorbers disposed on pipe A. Specifically, each shock absorber comprises: a main body 1 sleeved on an outer periphery of pipe A and a damping medium 2 filled in the main body 1. The main body 1 is provided with an inner cavity, and the inner cavity is divided into a plurality of chambers 13 to place the damping medium 2 respectively.

In the present embodiment, the main body 1 is sleeved on the outer periphery of pipe A, and the damping medium 2 is filled in the inner cavity configured in the main body 1, so that the shock absorber sleeved on pipe A can absorb the vibration generated by pipe A. As a result, the transmission of vibration can be greatly reduced. The vibration of pipe A can cause flowing, deformation and collision of the damping medium 2 in the inner cavity, forming a damping effect, thereby dissipating energy and effectively weakening the vibration of pipe A, and the assembly is convenient, the space occupation is small, and it is conducive to operation and use. In addition, the inner cavity is divided into multiple chambers 13, and each chamber 13 is placed with a damping medium 2. On the one hand, the damping medium 2 can be directly filled in the chamber 13 of the inner cavity without excessively increasing the mass and space occupation of the main body 1. On the other hand, it is ensured that the damping medium 2 can move freely in the respective chamber 13, so as to avoid the damping failure caused by excessive stacking of the damping medium 2, and to make sure that the shock absorber can have good vibration damping and noise reduction effects in the vibration environment, thereby greatly avoiding the damage of pipe A and interference on other linked equipment.

Figure 8:
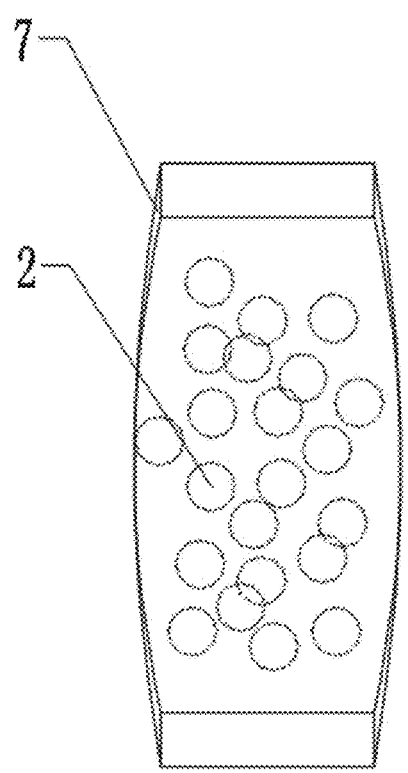
FIG. 8 is a structural schematic diagram of the damping bag of the shock absorber according to the first embodiment of the present disclosure.

As shown in FIG. 8, in one embodiment, the damping medium 2 is a granular material, and the granular material with a predetermined quantity is packaged by the wrapping 7 to form a damping bag, and a plurality of the damping bag are configured with different filling rates and stacked in the inner cavity. Among them, by configuring the main body 1 filled with damping medium 2 around the outer periphery of pipe A, the vibration intensity of the pipeline of pipes A is reduced, so as to ensure the smooth operation of the pipeline, and further ensure the safety and efficiency of pipe A in practical applications. Adding a shock absorber to the piping system can achieve a good vibration damping effect. In addition, the damping medium 2 is a granular material, which is packaged by the wrapping 7 with a predetermined quantity to form damping bags, and the damping bags are stacked in the inner cavity of the main body 1. Filling the damping medium by packages can not only gather the granular material to achieve the users preset form, so that the filling of the damping medium 2 is more concentrated, but also can reduce the granular materials being squeezed out to the outer edge (squeezed out to the edge of the cavity wall of the inner cavity), thereby achieving good vibration damping effects with simple structure, convenient operation, conducive to promotion and application.

In a preferred embodiment, the damping bags are filled with different predetermined amount of granular material, and the inner cavity is divided into a plurality of chambers 13 for placing different quantities of damping bags respectively. Since the damping bags are filled with different amount of particle material, different damping effect can be achieved by different damping bag. Moreover, since different chambers 13 are filled with damping bags with different damping effects and the quantity of the damping bag also varies, the chambers 13 have diverse vibration damping effects to eliminate different vibration peaks, thereby greatly improving the vibration damping and noise reduction performance of the shock absorber provided on the pipeline.

Figure 9:
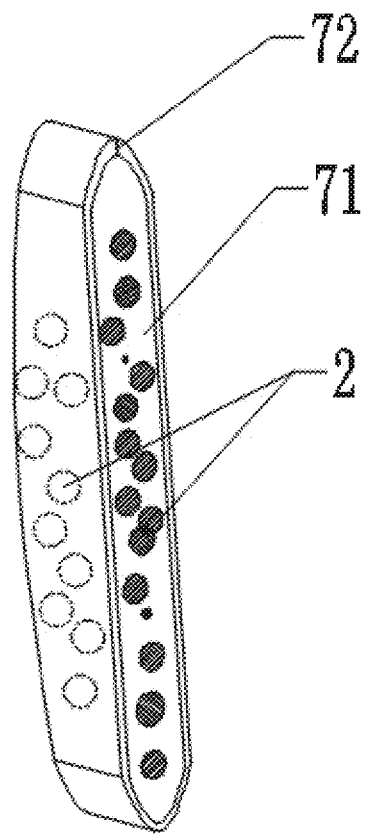
FIG. 9 is a cross-sectional view of FIG. 8 from one of the viewing angles.

As shown in FIG. 9, in one embodiment, the wrapping 7 is a plastic bag having a cavity 71 for storing granular material and a sealable opening 72 that can be opened and closed and is an access to the cavity 71. The sealable opening 72 of the bag can be opened to add or change the granular material and the sealable opening 72 can be closed afterwards, so as to change the damping effect of the damping bag and the packaging and sealing requirements of the damping bag can be satisfied. In other embodiments, the wrapping 7 may also be a polymer material, latex or rubber and other soft shell structure, as long as the material is able to wrap the particle material with certain amount.

In one embodiment, particularly, the main body 1 is roughly in a hoop shape, and the inner cavity is divided by an isolation member, so as to correspondingly form the mutually independent chambers 13. Specifically, the chambers 13 are spaced apart along a direction around pipe A. The hoop-shaped main body 1 is sleeved around the outer periphery of pipe A, and it should be ensured that the main body 1 is tightly engaged with pipe A to improve the stability of vibration damping. In addition, the configuration that the independent chambers 13 are spaced apart along the direction around pipe A is suitable for the vibration diffusion mode of the pipeline (spreading outward circumferentially from pipe A) and can further enhance the vibration damping effect of the chambers 13.

Figure 4:
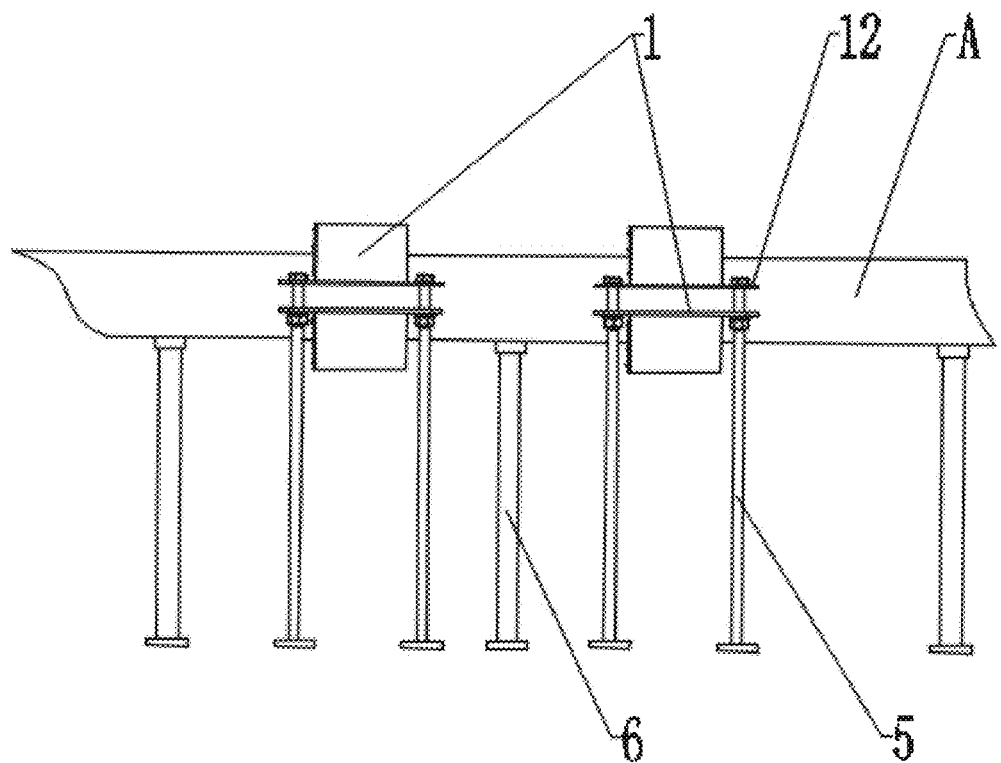
FIG. 4 is a schematic diagram showing the piping system according to the first embodiment of the present disclosure applied in one of the preferred scenarios.
Figure 7:
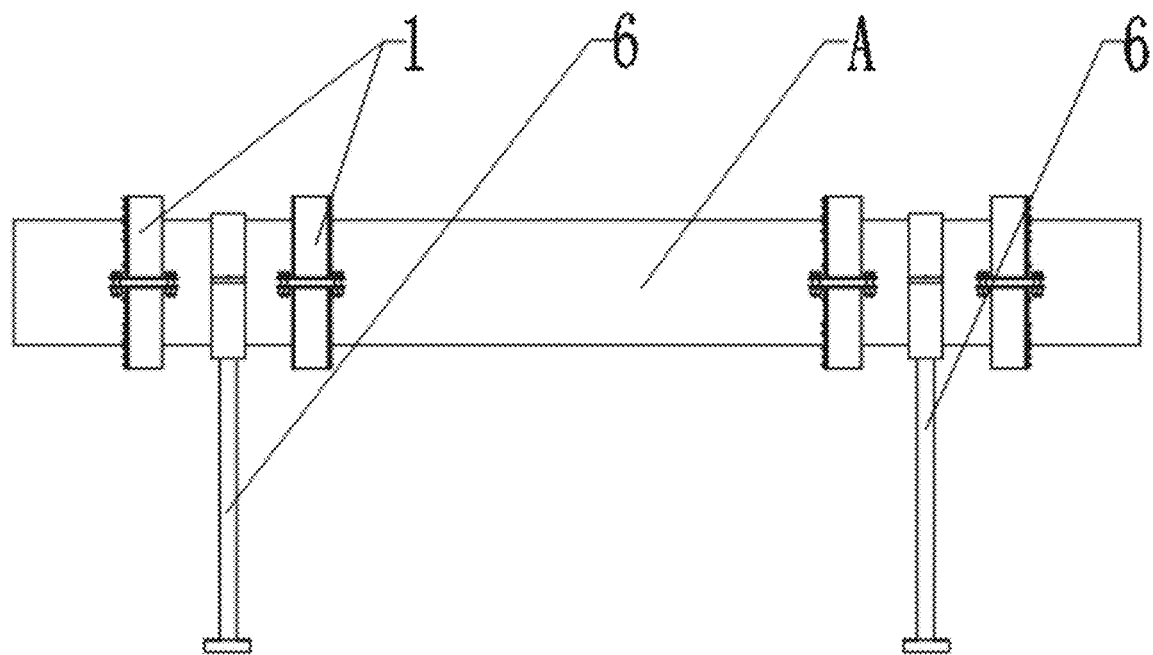
FIG. 7 is a schematic diagram showing the piping system according to the first embodiment of the present disclosure applied in a scenario where the buffer brackets are configured in the form of rigid support.

Referring to FIGS. 4 and 7, each shock absorber is connected to an external support bracket 5, and the external support bracket 5 is vertically arranged between the shock absorber and the mounting plane, so that one end of the support bracket 5 is connected to one side of the shock absorber, and the other end of the support bracket 5 is configured on the mounting plane. Specifically, the mounting lug 12 protruding outward is used to connect with the external support bracket 5. The external support bracket 5 is vertically arranged between the shock absorber and the mounting plane, so that one end of the support bracket 5 is connected to the mounting lug 12, and the other end of the support bracket 5 is configured on the mounting plane, so as to provide support for the shock absorber provided on pipe A, and to a certain extent, the vibration of pipe A can be transmitted and decomposed indirectly through the support bracket 5.

In one embodiment, the piping system further includes buffer brackets 6. A plurality of the buffer brackets 6 spaced apart are arranged between different shock absorbers along a pipe laying direction for supporting pipe A and suspending pipe A above the mounting plane. Further, the support bracket 5 and buffer bracket 6 both can withstand the weight of pipe A, and can also limit the displacement of pipe A and absorb vibration, such that the safety of pipe A can be ensured, the vibration of the pipeline can be effectively reduced, and vibration and noise can be avoided.

Figure 5:
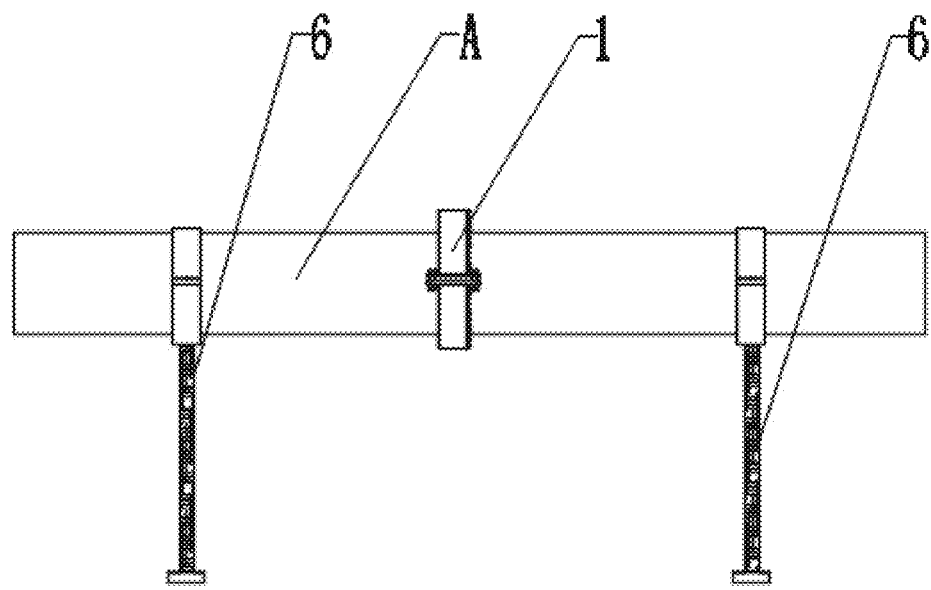
FIG. 5 is a schematic diagram showing the piping system according to the first embodiment of the present disclosure applied in a scenario where the buffer brackets are configured in the form of elastic support.
Figure 6:
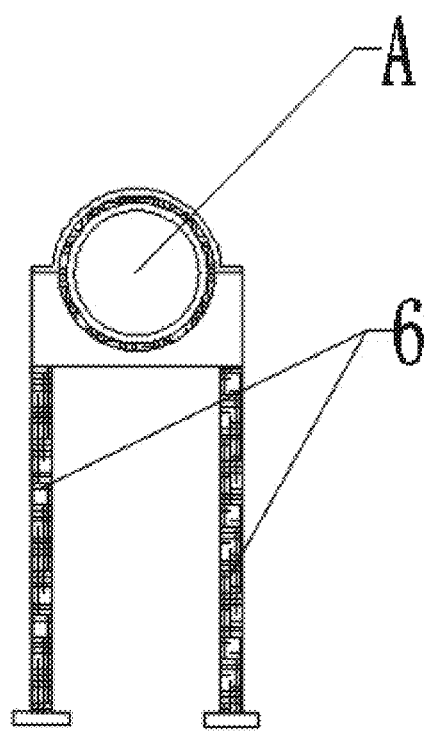
FIG. 6 is a structural schematic diagram showing the structure of FIG. 5 from another perspective.

Referring to FIGS. 5 and 6, in one preferred embodiment, the buffer bracket 6 is configured between the mounting plane and pipe A to offer support by connecting with and propping up against a fastening hoop arranged around the outer periphery of pipe A. Preferably, each fastening hoop is equipped with at least two buffer brackets 6 at the bottom. Among them, the buffer bracket 6 arranged between pipe A and the mounting plane may cause elastic support, specifically a rubber gasket may be provided between the fastening hoop and pipe A, or the buffer bracket 6 is preferably an elastic support rod, so as to realize the elastic support configuration of the buffer bracket against pipe A. In particular, the buffer brackets 6 being configured in the form of elastic support are at least arranged on both sides of a shock absorber along the pipe laying direction to achieve more efficient vibration and noise reduction of pipe A. By adding elastic support at the weak point of the stiffness of the piping system, the rigidity of the piping system can be effectively improved, the vibration can be reduced, and the pipeline vibration can be effectively absorbed. The form of elastic support can suppress transmission of the vibration generated by the piping system to the application environment (such as ships, buildings, military, etc.) through the mounting plane, and can also avoid transmission of the vibration generated by the application environment to the piping system and causing violent vibration of the pipe A.

Referring to FIG. 7, in another embodiment, the buffer bracket 6 is configured between pipe A and the mounting plane in the form of rigid support. Specifically, the buffer bracket 6 is a rigid support rod and is directly arranged around pipe A through a fastening hoop, so as to realize the rigid support configuration of the buffer bracket against pipe A. Specifically, each of the two sides of the buffer bracket 6 in the form of rigid support is equipped with at least one shock absorber along the pipe laying direction, so that the vibration of pipe A can be attenuated at the buffer bracket 6 placed between the two shock absorbers. When rigid support is used, the shock absorber should be arranged on both sides close to the rigid support for the pipeline, so that the vibration generated by the piping system is mostly absorbed before propagating to the buffer bracket 6 and the application environment, thereby greatly reducing the vibration. Similarly, the vibration from the application environment can also be absorbed, so that the vibration propagated to the piping system can be greatly reduced.

In one embodiment, preferably, pipe A is a flexible pipe, and the shock absorbers are detachably configured to the end portions of the flexible pipe at positions close to the pipe fitting. By configuring the shock absorbers at both ends of the flexible pipe where the flexible pipe connects with the pipe fitting 8, the vibration damping effect can be significantly improved. When pipe A is a flexible pipe, due to the small stiffness of the flexible pipe, the shock absorbers being arranged at the two end portions of the flexible pipe in the pipeline and located at two sides close to the external pipe fittings 8 can make the piping system have small deformation, and the vibration at both ends of the flexible pipe can be absorbed by the shock absorbers, so that the vibration generated at the flexible pipe and the external pipe fittings 8 can be greatly reduced, the wear between the pipes is reduced, and the service life of the flexible pipe is greatly improved. In particular, the flexible pipe may be a rubber pipe or metal pipe. By assembling or disassembling the hoop elements 11, the main body 1 of the shock absorber is adaptable to various flexible pipes with good fastening and fitting, so that the vibration damping effect is stronger.

In other embodiments, pipe A may be a rigid pipe. Specifically, the middle of the rigid pipe is detachably configured with at least one shock absorber correspondingly. When pipe A is a rigid pipe, the shock absorber is preferably arranged at the middle of the rigid pipe. Due to the large stiffness of the rigid pipe, the weight of the shock absorber has little effect on the deformation of the piping system, and the vibration of the rigid pipe is more severe at the middle area of the pipe, so that the shock absorber being detachably configured at the middle of the rigid pipe can, on the one hand, lower the impact on the deformation of the piping system, and on the other hand, fully absorb the vibration in the piping system through the shock absorber, thereby achieving the function of efficient vibration and noise reduction.

Figure 10:
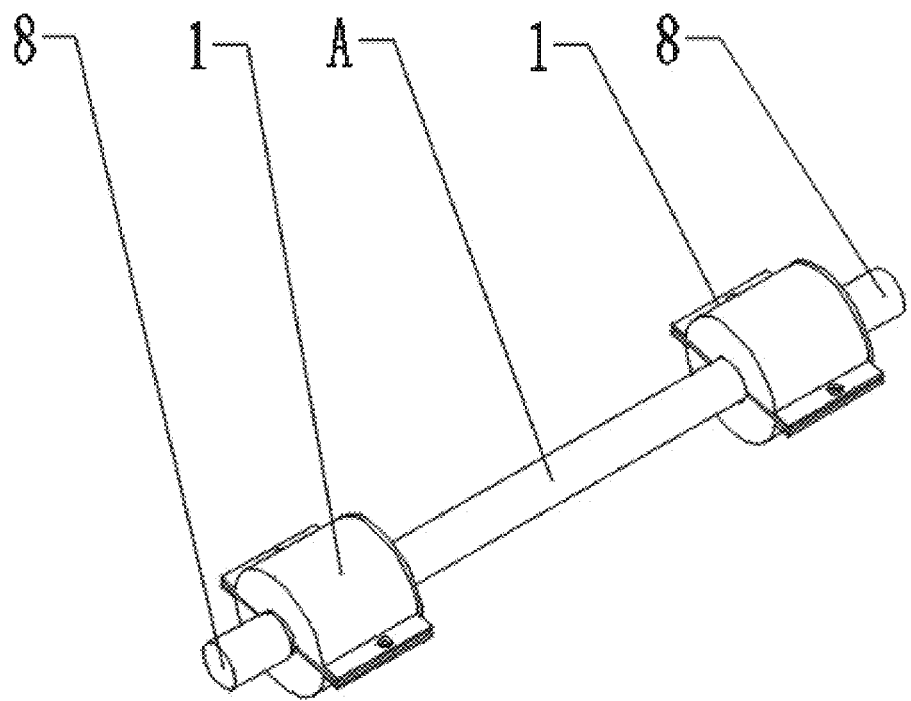
FIG. 10 is a schematic diagram showing the piping system according to the first embodiment of the present disclosure applied in another preferred scenario.

Referring to FIG. 10, in a preferred embodiment, both ends of pipe A are provided with shock absorbers, and the middle of pipe A is detachably configured with at least one shock absorber (not shown) correspondingly. The additionally installed shock absorber at the middle of pipe A can work collaboratively with the shock absorbers located at the end portions of pipe A, so as to jointly absorb the vibration and reduce noise of pipe A, achieving excellent effects.

FIG. 11 is a diagram showing the comparison of the damping effect of the shock absorber of the present disclosure. Specifically, in either cases where two end portions of pipe A are provided with the shock absorbers or there is no shock absorber provided, vibration tests are performed for pipe A and its environment to obtain the vibration spectrum curves before and after installation. Curve 3 in the figure represents the vibration of the pipe when no shock absorber is installed, and curve 4 represents the vibration of the pipe when the shock absorbers are installed at two end portions of pipe A. Compared with the case that no shock absorber is installed, it can be easily figured out that by installing the shock absorbers at two end portions of pipe A, the vibration of pipe A is greatly reduced.

Figure 13:
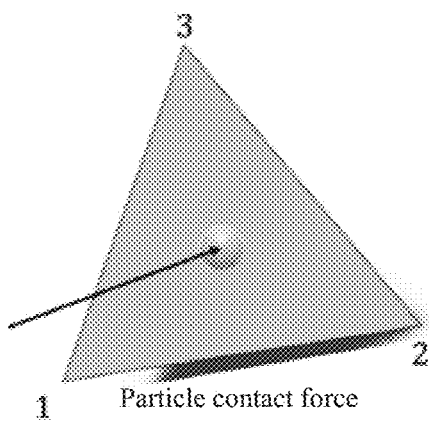
FIG. 13 is a schematic diagram showing the contact force of a planar triangular shell element in a discrete element.
Figure 14:
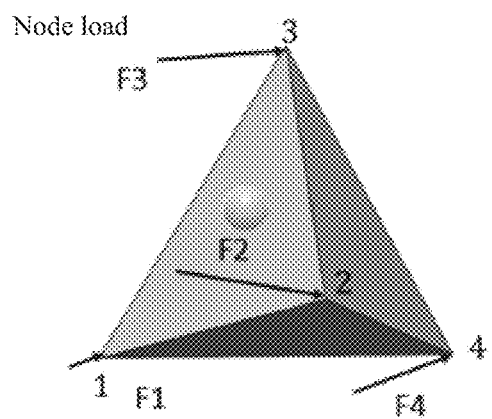
FIG. 14 is a schematic diagram showing the equivalent nodal forces of a triangular shell element in a finite element.

Referring to FIGS. 12 to 14, according to some embodiments, the present disclosure further provides a method for designing vibration reduction of a piping system, which includes the following steps:

S101, performing vibration test for the piping system to be treated in a working state to determine a main frequency band of a vibration distribution and a frequency range of a sweep test of the piping system;

S102, performing a modal dynamics simulation of an established piping system model according to a type of piping system to obtain a modal mode shape of the piping system.

In the present embodiment, modeling of the piping system to be treated is firstly performed to obtain a piping system model, and then the piping system model is simulated for simulation calculation. Specifically, when the type of piping system is rigid pipe structure and the supporting form is unsupported or rigid support, the modal dynamics simulation of the established piping system model is carried out by finite element simulation to obtain the modal mode shape of the piping system. When the piping system adopts a rigid pipe structure and the supporting form is elastic support, or adopts a flexible pipe structure, the structure of the elastic material in the piping system is first subjected to uniaxial tension, equal biaxial tension, and plane-strain tension tests to accurately obtain the parameters of the nonlinear hyperelastic analysis model of the elastic material. The material properties of the inelastic finite element simulation are set. Then, the parameter matrix of nonlinear finite element simulation is imported into the piping system model for modal dynamics simulation to obtain the modal mode shape of the piping system.

Among them, the above-mentioned modal mode shape of the piping system is obtained after the modal dynamics simulation of the piping system model, which characterizes the vibration state and vibration mode of the piping system, and the position of the maximum vibration of the piping system can be derived therefrom.

S103, determining an installation position of a shock absorber model in the piping system model according to the obtained main frequency band of the vibration distribution of the piping system and the modal mode shape of the piping system, and setting the shock absorber model in the installation position to obtain a vibration damping system model.

In the present embodiment, the shock absorber dissipates the vibration energy mainly by the inelastic collision and friction between particles, so the shock absorber installed to the maximum vibration point of the corresponding order of the piping system can increase the number of collisions of particles and the friction energy generated, which can effectively improve the energy dissipation effect of the shock absorber.

Specifically:

Firstly, according to the modal mode shape of the piping system and the main frequency band of vibration distribution, the maximum vibration point of the pipeline under different orders is obtained.

Then, the shock absorber model is mounted under the maximum vibration point of the corresponding order of the piping system model to obtain the vibration damping system model.

Among them, in the present embodiment, the shock absorber model should be established first, then after obtaining the maximum vibration point of each order, the shock absorber model is added to the corresponding position of the piping system model, that is, the vibration damping system model containing the piping system model and the shock absorber model can be obtained.

S104, performing simulation on the vibration damping system model by finite element and discrete element coupling according to the frequency range of the sweep test to determine an optimal value of each configuration parameter of the shock absorber model, and designing vibration reduction based on the optimal value of the configuration parameter.

In the present embodiment, the shock absorber model includes some necessary configuration parameters, these configuration parameters include the number of cavities of the shock absorber, particle filling method, particle material, particle diameter, particle filling rate, particle surface friction factor.

After obtaining the vibration damping system model, it is also necessary to solve the configuration parameters of the shock absorber model to obtain the best vibration damping effect.

Specifically, the coupling simulation of finite element and discrete element can be used to determine the optimal values of the number of cavities, particle filling method, particle material, particle diameter, particle filling rate, and particle surface friction factor of the shock absorber in the vibration damping system model.

In the present embodiment, the particle system of the shock absorber model is a discrete system, so the discrete element method is used for calculation. The pipeline and its supporting structure are continuous element entities, and the finite element method is used for calculation. The basic idea of finite element and discrete element coupling simulation is to treat the particle system in the shock absorber as several discrete element bodies, while the calculation of the piping system uses the finite element method to calculate its response, and the internal stress and deformation of each mesh element are solved by the implicit time format linear finite element method. Then, the discrete element method is used to calculate the excitation state of the particle system in the shock absorber under the excitation of the piping system structure, and the damping force of the particle system on the shock absorber structure is calculated. Through the nodal conversion method based on shape function, the damping force is converted into the finite element of the piping system, and the particle damping force of the entire simulation time is obtained by repeating multiple time steps.

Among them, the nodal conversion method based on the shape function is as follows.

Firstly, when the tetrahedral meshing of the piping system model is carried out, the triangular shell element division of the discrete element vibration absorber model is carried out, and during the division process, the one-to-one correspondence of mesh elements of the geometric element body in the discrete element calculation and the finite element calculation should be guaranteed, that is, the element ID and node number of the two are consistent. Specifically, the tetrahedral element consists of four triangular shell elements. Then, Then, on the triangular shell elements obtained from the simulation by the discrete element method, based on the element ID number, the particle damping force of each element ID is synthesized on the local coordinate system, and the force condition of each triangular shell element is counted.

Specifically, it includes:

Equivalent displacement of the contact force of planar triangular shell elements in discrete elements.

Specifically, as shown in FIG. 2, for a three-node triangular planar element with M particles acting on the triangular shell element, its contact force is calculated as follows.

For a local coordinate system (x,y,z) located at the center P point of the x-y plane, let it coincides with the plane of the triangular shell element, $u_{ij}$ is a unit vector from point i to point j, and $u_{ik}$ is a unit vector from point i to point k, and the unit normal vector n of a planar triangular shell element is:

$$\vec{n} = \frac{\vec{u_{ij}} \times \vec{u_{ik}}}{|\vec{u_{ij}} \times \vec{u_{ik}}|}$$

The x direction of the local coordinate system is consistent with $u_{ij}$, and the $\vec{u_x}$, $\vec{u_y}$ and $\vec{u_z}$ of the local coordinate system can be expressed as:

$$\vec{u_x} = \vec{u_{ij}},\ \vec{u_y} = \vec{n} \times \vec{u_x},\ \vec{u_z} = \vec{n}$$

The relationship between the local coordinate system and the global coordinate system is:

$$\{x,y,z\}^T = [T_{trans,1}]\{X,Y,Z\}^T$$

$$[T_{trans,1}] = [\{\vec{u_x}\}\{\vec{u_y}\}\{\vec{u_z}\}]^T$$

For the vibration response of the piping system structure, each node in the piping system has six degrees of freedom, including three displacements and three angles. The displacement matrix $\{U_{6\times 1}\}$ is related to it by shape function $[N]_{6\times 18}$ and node displacement $\{A\}_{18\times 1}$:

$$\{U\}_{6\times 1} = [N]_{6\times 18}\{A\}_{18\times 1}$$

where $\{U\}^T = \{u_x, u_y, u_z, \theta_x, \theta_y, \theta_z\}$; $\{A\}^T = \{u_{xi}, u_{yi}, u_{zi}, \theta_{xi}, \theta_{zi} \ldots u_{xk}, u_{yk}, u_{zk}, \theta_{xk}, \theta_{yk}, \theta_{zk}\}$ The external virtual work induced by contact force is:

$$\delta W = \Sigma_{m=1}^M \{\delta U_m\}_{1\times 6}^T \{\vec{F_{con,m}}\}_{6\times 1} = \{\delta A\}_{1\times 18}^T \Sigma_{m=1}^M \{N_m\}_{18\times 6}^T \{\vec{F_{con,m}}\}_{6\times 1}$$

where $\{\vec{F_{con,m}}\}_{6\times 1}$ is the contact force vector acting on the contact point m in the local coordinate system. m refers to the point of contact, M is the number of contact points of the particle acting on this planar triangular element.

In this case, the equivalent nodal force in the local coordinate system:

$$\{\vec{F}_{con,nodal}\}_{18\times 1} = \Sigma_{m=1}^M \{N_m\}_{18\times 6}^T \{\vec{F_{con,m}}\}_{6\times 1}$$

To transform the contact force in the local coordinate system to the contact force in the global coordinate system:

$$[T_{trans,2}]_{6\times 6} = \begin{bmatrix} [T_{trans,1}] & 0 \\ 0 & [T_{trans,1}] \end{bmatrix}$$

The nodal force in the local coordinate system is transformed by the following formula:

$$[T_{trans,3}]_{18\times18} = \begin{bmatrix} [T_{trans,2}] & 0 & 0 \\ 0 & [T_{trans,2}] & 0 \\ 0 & 0 & [T_{trans,2}] \end{bmatrix}$$

The contact force of the nodes under the global coordinate system is obtained:

$$\{\vec{F}_{con,nodal}\}_{18\times1} = \Sigma_{m=1}^{M}[T_{trans,3}]^{T}_{18\times18}\{N_m\}_{18\times6}^{T}[T_{trans,2}]^{T}_{6\times6}\{F_{com,m}\}_{6\times1}.$$

Then, the equivalent nodal forces of the triangular shell elements in the finite element are calculated.

As shown in FIG. 3, the equivalent nodal force of the triangular shell element is obtained by respectively moving the concentrated force, the surface force, and the volume force acting on the triangular shell element to the node, and then synthesizing the forces on each node. After calculating the equivalent nodal forces of all elements of the elastomer, all the equivalent nodal forces are gathered to obtain the overall structural nodal load array.

Among them, the magnitude of the equivalent nodal force is determined according to the principle of imaginary displacement, that is, the work done by the equivalent nodal force is equal to the work done by the three forces acting on the element on any imaginary displacement, namely:

$$(\{\sigma^*\}^e)^T\{R\}^e = \{f^*\}^T\{G\} + \int\{f^*\}^T\{q\}tds + \iint\{f^*\}^T\{p\}tdxdy$$

In the above formula, the left part of the equal sign represents the imaginary work done by the equivalent nodal force $\{R\}^e$ of the triangular shell element, the first item on the right part of the equal sign is the imaginary work done by the concentrated force load $\{G\}$, the second term represents the imaginary work done by the surface force $\{q\}$, the third term represents the imaginary work done by the volumetric force $\{p\}$, t is the thickness of the element, which is assumed to be constant.

The imaginary displacement of the points within the triangular shell element is:

$$\{f^*\} = [N]\{\sigma^*\}^e$$

So there are:

$$(\{\sigma^*\}^e)^T\{R\}^e = (\{\sigma^*\}^e)^T[N]^T\{G\} + \int[N]^T\{q\}tds + \iint[N]^T\{p\}tdxdy$$

The multiplication of $[N]^T\{G\}$ on the right side of the equation by the imaginary displacement of the node is the imaginary work done for the concentrated force, which is recorded as $\{F\}^e$, which represents the equivalent nodal force obtained by the concentrated force load on the element being moved to the node. $\int[N]^T\{q\}tds$ is the equivalent nodal force obtained by the surface force on the triangular shell element moved to the node, which is recorded as $\{Q\}^e$; $\iint[N]^T\{p\}tdxdy$ is the equivalent nodal force obtained by the volume force on the element moved to the node, which is recorded as $\{P\}^e$.

So there is:

$$\{R\}^e = \{F\}^e + \{Q\}^e + \{P\}^e$$

For this, the load array can be written as:

$$\{R\} = \sum_{e=1}^{N}(\{F\}^e + \{Q\}^e + \{P\}^e) = \{F\} + \{Q\} + \{P\}$$

For the concentrated force equivalent load array, the equivalent nodal forces of each element are synthesized point by point and arranged in the order of node numbers, which can form the concentrated force equivalent load array of the elastomer, that is:

$$\{F\} = \Sigma_{e=1}^{N}\{F\}^e$$

where, $\{F\}^e = (N_i)_c\{G\}$, $(N_i)_c$ is the value of the shape function at the point of concentrated force.

Equivalent nodal force array is:

$$\{F\}^e = [F_{ix}F_{iy}F_{jx}F_{jy}F_{mx}F_{my}]^T$$

The imaginary displacement of the element node is:

$$\{\sigma^*\}^e = [U_i^*V_i^*U_j^*V_j^*U_m^*V_m^*]^T$$

Correspondingly, for the surface force load, the surface force acting on the boundary of the triangular shell element is moved to the node, that is, the equivalent nodal force of the surface force of each triangular shell element can be synthesized point by point, and arranged in the order of node numbers, which forms the equivalent load array of the surface force of the elastomer;

$$\{Q\} = \Sigma_{e=1}^{N}\{Q\}^e$$

For the equivalent load array of volumetric forces, the equivalent volumetric forces of the triangular shell elements are synthesized at each node, then arranged in the order of node numbers for synthetization;

$$\{P\} = \Sigma_{e=1}^{N}\{P\}^e$$

Figure 15:
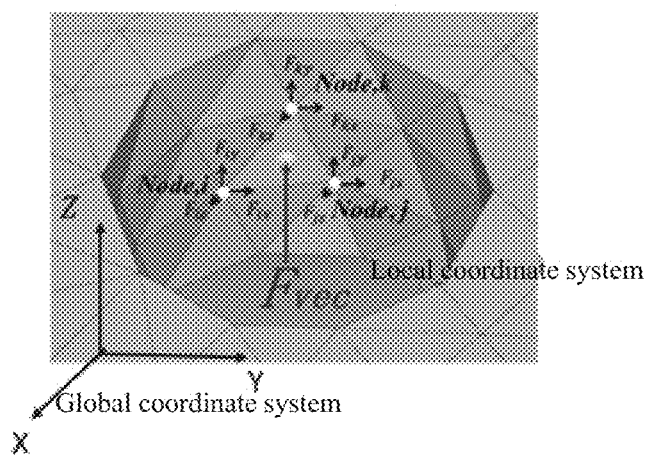
FIG. 15 is a schematic diagram in which the particle damping forces on each cell ID are synthesized on the local coordinate system to calculate the force of each shell element.

As shown in FIG. 15, the force between the boundary particles and the tetrahedral element in the shock absorber is converted to the corresponding node designation, and the damping effect of the particle material is expressed by the damping force at the moment with the element ID number and the element node number as the link, so as to establish the coupling effect between the discrete element calculation method and the finite element calculation method.

In the present embodiment, according to the contact force and the equivalent nodal force calculated above, the force of the boundary particle and the tetrahedral element in the shock absorber is converted to the corresponding node designation. Taking the element ID number and the element node number as the link, the damping effect of the particle material is expressed by the damping force at the moment, and the coupling effect between the discrete element calculation method and the finite element calculation method can be established. Then the vibration excitation of the piping system under the working state can be simulated.

Specifically, during the simulation, according to the frequency range of the sweep frequency test, the frequency range of the frequency sweep excitation of the piping system model is set and analyzed by finite element and discrete element coupling simulation to simulate the vibration excitation of the piping system under working conditions. Among them, the finite element and discrete element coupling simulation can be carried out for different cavities number, different particle materials, different particle diameters, and different particle filling rates. Taking the total effective value of structural response acceleration under pipeline sweep excitation as the measurement standard, the optimal values of the configuration parameters of the shock absorber under different piping system parameters are obtained.

Figure 16:
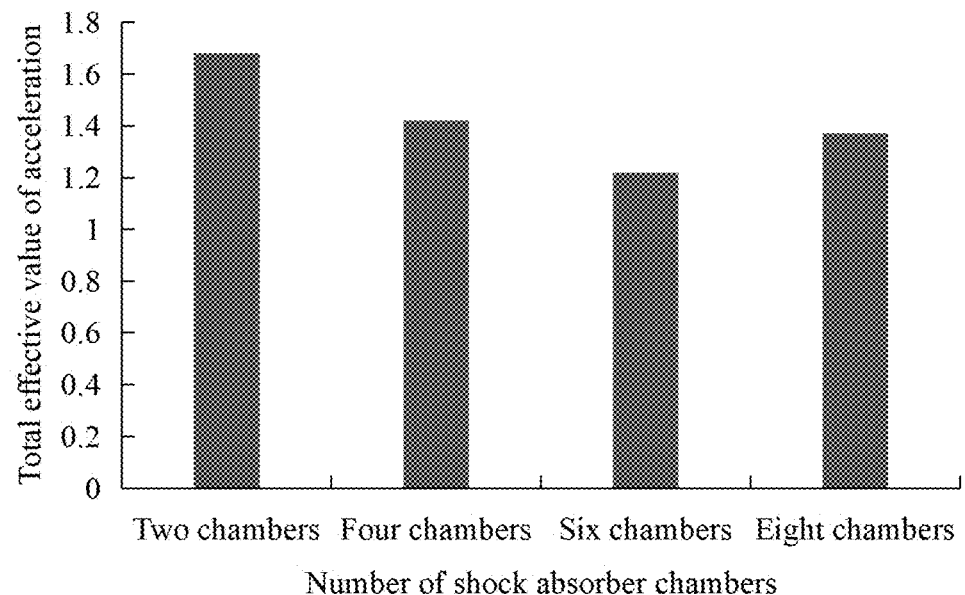
FIG. 16 is a diagram showing the total RMS (Root-Mean-Square) value of acceleration for different numbers of chambers.
Figure 17:
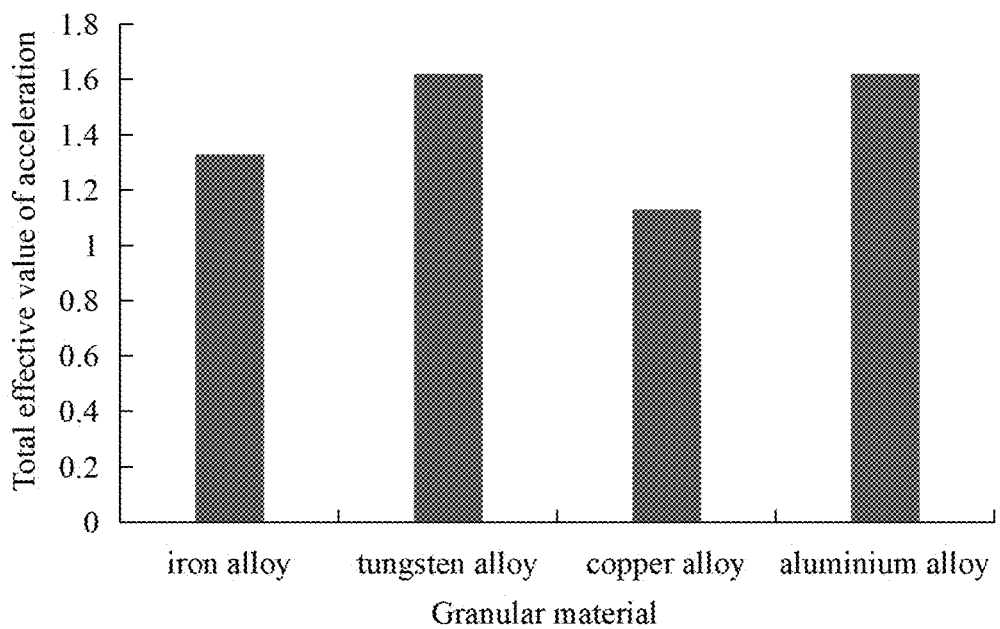
FIG. 17 is a diagram showing the total RMS value of the acceleration for different particle materials.
Figure 18:
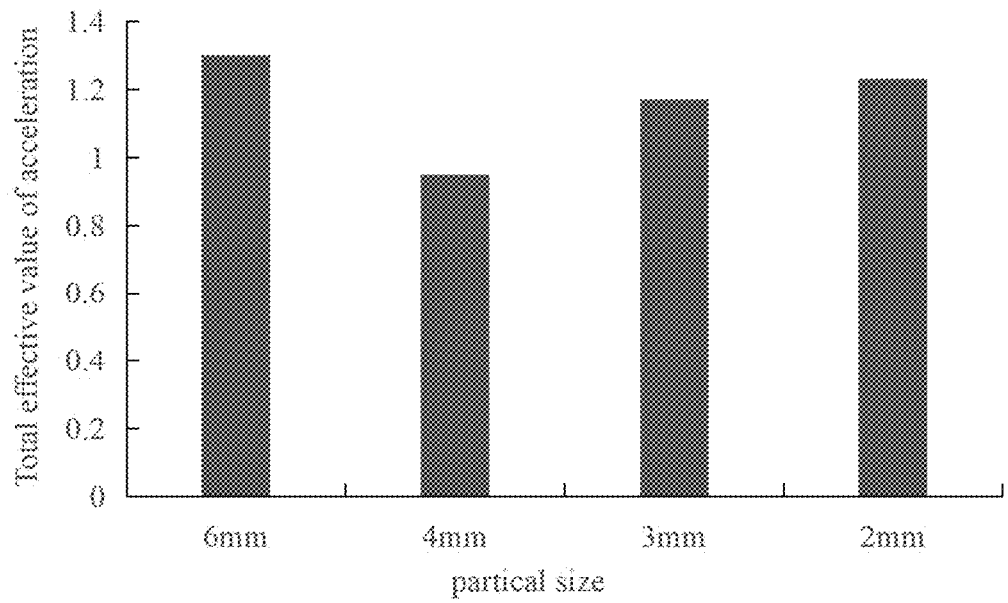
FIG. 18 is a diagram showing the total RMS value of the acceleration for different particle diameters.
Figure 19:
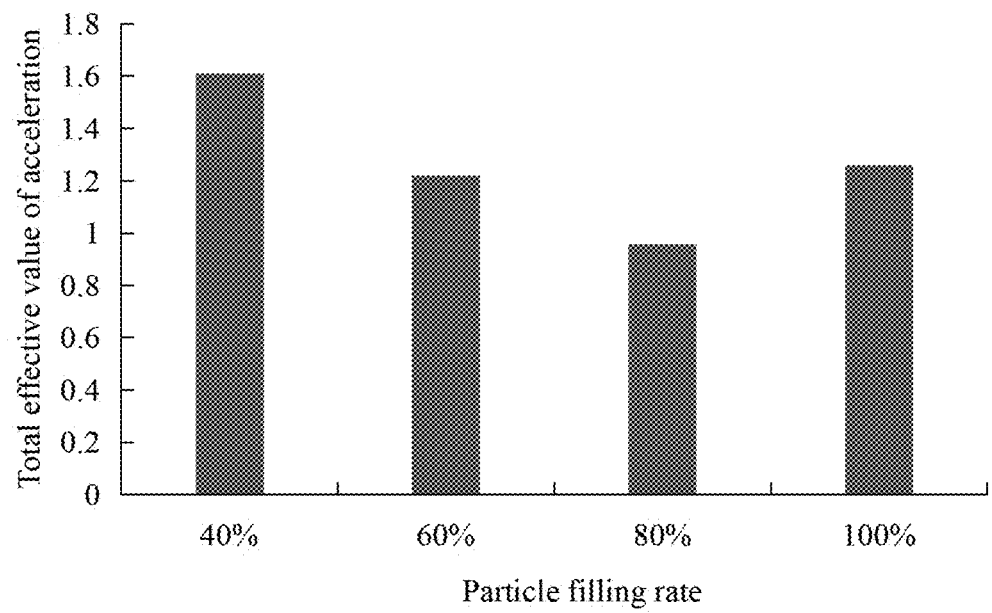
FIG. 19 is a diagram showing the total RMS value of acceleration for different particle filling rates.

For example, the present embodiment is described below with an optimal configuration process of an actual piping system.

a. As shown in FIG. 16, the finite element and discrete element coupling analysis was carried out on the shock absorber structure with two chambers, four chambers, six chambers and eight chambers, respectively. The particle material was set to be Iron-based alloys, the particle diameter was 2 mm, and the filling rate was 80%. Under the pipeline sweep excitation, the comparison of the total effective value of the structural response acceleration of the finite element and discrete element coupling simulation shows that under the excitation of the piping system and its working vibration, the optimal number of chamber division of the shock absorber structure should be six chambers.

b. As shown in FIG. 17, the finite element and discrete element coupling analysis was carried out on the shock absorber with particle materials of Iron-based alloys, tungsten-based alloy, copper alloy and aluminum alloy, respectively. The shock absorber structure was configured with six chambers, the particle diameter was 2 mm, and the filling rate was 80%. The comparison of the total effective values of structural response acceleration in finite element and discrete element coupling simulation under pipeline sweep excitation shows that under the excitation of the piping system and its working vibration, the optimal material of the shock absorber particles should be copper alloy.

c. As shown in FIG. 18, the finite element and discrete element coupling analysis was carried out on the shock absorber with the particle diameters of 6 mm, 4 mm, 3 mm and 2 mm, respectively. The structure of the shock absorber was configured with six chambers, the particle material was copper alloy, and the filling rate was 80%. The comparison of the total effective values of structural response acceleration in finite element and discrete element coupling simulation under pipeline sweep excitation shows that the optimal diameter of the shock absorber particles should be 4 mm under the excitation of the piping system and its working vibration.

d. As shown in FIG. 19, the finite element and discrete element coupling analysis was carried out on the shock absorber of the piping system with the particle filling rate of 40%, 60%, 80% and 100%, respectively. The structure of the shock absorber was configured with six chambers, the particle material was copper alloy, and the particle diameter was 4 mm. The comparison of the total effective values of structural response acceleration in finite element and discrete element coupling simulation under pipeline sweep excitation shows that the optimal filling rate of shock absorber particles should be 80% under the excitation of the piping system and its working vibration.

In the present embodiment, preferably, after obtaining the optimal value of the configuration parameters, the following measures are taken.

According to the frequency range of sweep frequency test and the optimal values of the configuration parameters, the simulation results obtained by the finite element and discrete element coupling simulation are verified by laboratory sweep frequency test. And comparison tests of the shock absorber of the vibration damping system with the particles filled in the form of packaged bags and with the particles filled directly are performed to determine the final vibration damping design scheme.

Among them, according to the frequency range of the sweep frequency test obtained in step S101, the sweep frequency excitation of the same frequency range is applied to the experimental piping system. The total effective value of structural response acceleration under sweep excitation of the piping system is used as a measurement standard to verify the vibration damping effect of the piping system under the same excitation as the working frequency band.

Figure 20:
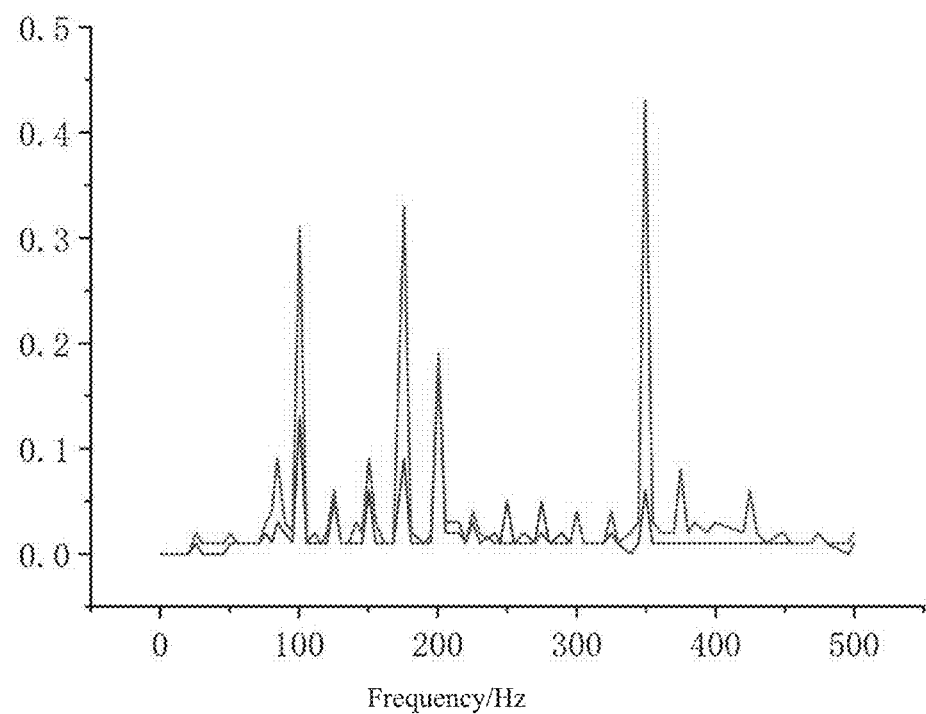
FIG. 20 is a diagram showing the comparison of direct filling and filling with bag.
Figure 21:
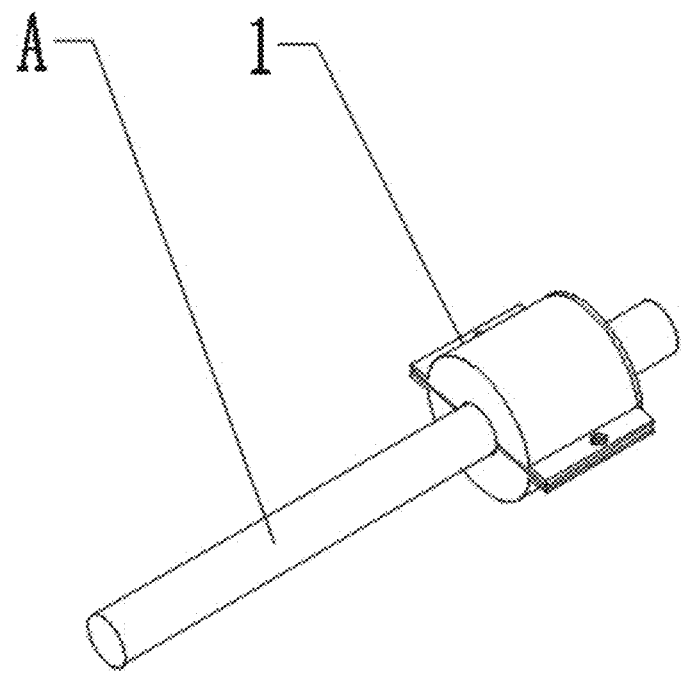
FIG. 21 is a structural schematic diagram of the shock absorber according to the second embodiment of the present disclosure which is assembled with a shaft body.
Figure 22:
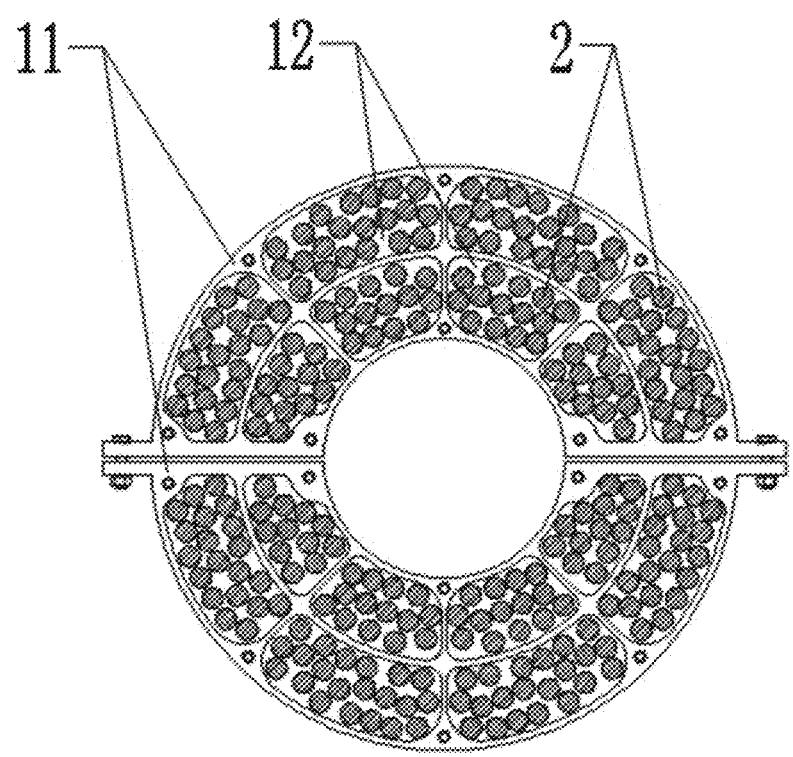
FIG. 22 is a cross-sectional view of the shock absorber according to the second embodiment of the present disclosure.
Figure 23:
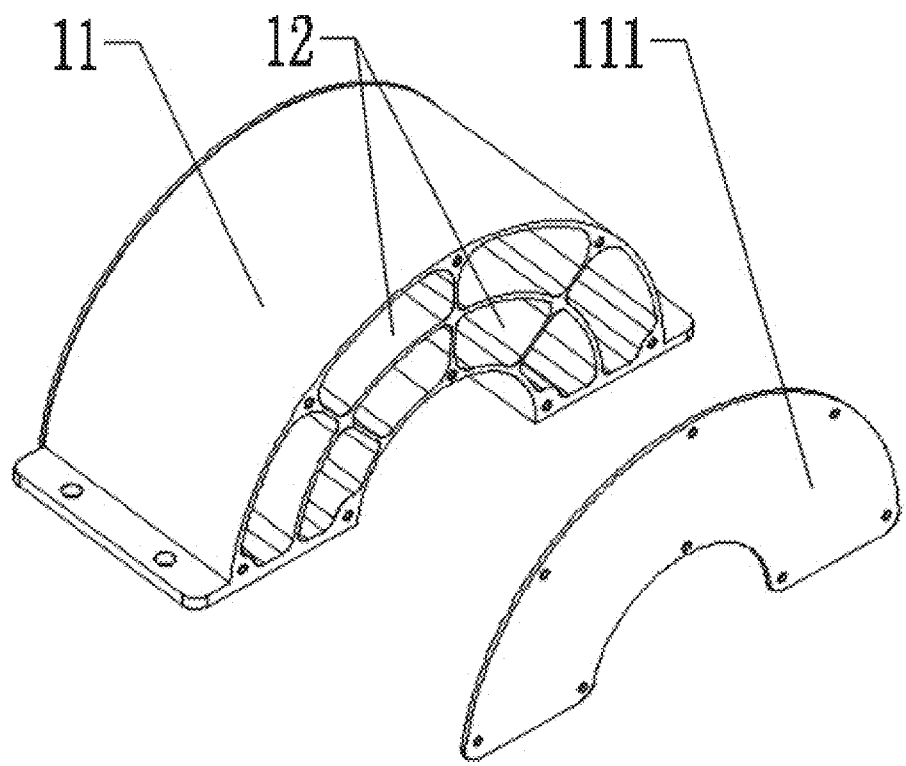
FIG. 23 is a schematic diagram of partial disassembly of the hoop elements of the shock absorber according to the second embodiment of the present disclosure.
Figure 24:
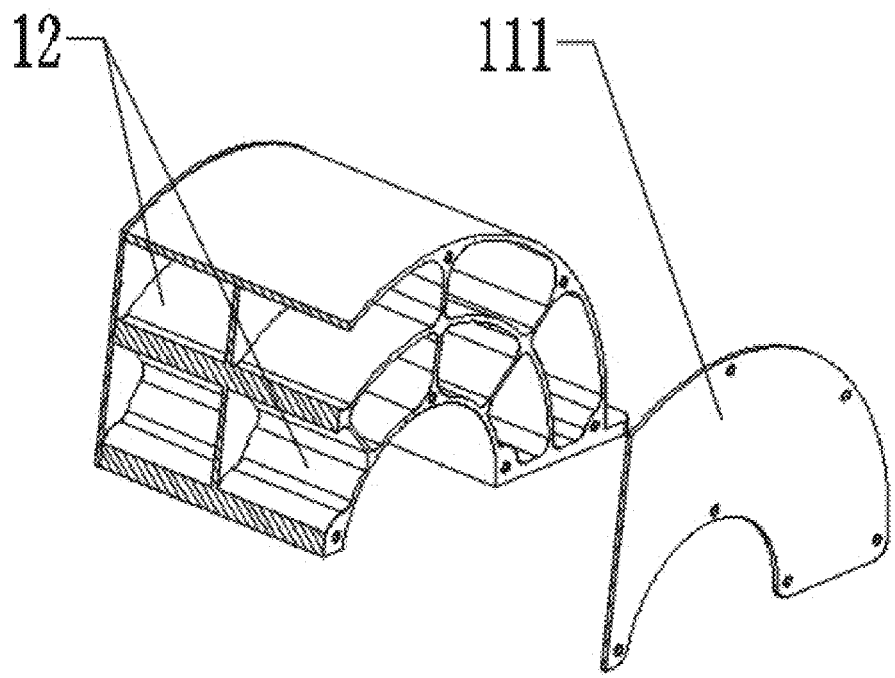
FIG. 24 is a cross-sectional view of FIG. 23 from one of the perspectives.

As shown in FIG. 20, through experimental verification, it is found that the vibration damping effect of the shock absorber of the piping system with the particles filled in the form of packaged bags is better than the damping effect of the shock absorber with the particles filled directly.

In summary, the vibration damping design method of the piping system proposed based on the embodiment of the present disclosure can optimize the pipeline vibration problem by adjusting the configuration of the shock absorber of the pipeline without changing the supporting structure of the piping system. Therefore, the pipeline shock absorber of the pipeline damping system is optimally adapted to the pipeline support method, and the vibration damping effect of the piping system is effectively reduced.

Embodiment 2

Referring to FIG. 21 to FIG. 24, the present disclosure also provides a shafting hoop-type particle damping shock absorber, which is used to be arranged on rotary shaft A. The shafting hoop-type particle damping shock absorber includes a main body 1 sleeved on the outer periphery of the rotary shaft A and damping particles 2 filled inside the main body 1. The main body 1 has a plurality of chambers 12 for placing the damping particles 2, separately. The chambers 12 are arranged in a regular arrangement in the main body 1, and the chambers 12 surround around the rotary shaft A at intervals along the axial direction of the rotary shaft A.

In the present embodiment, by configuring the main body 1 filled with damping particles 2 around the outer periphery of the rotary shaft A, the vibration of the rotary shaft A is reduced, ensuring the smooth operation of the rotary shaft A, and further ensuring the safety and efficiency of the shafting transmission system during work. The shafting transmission system is equipped with shock absorbers, which can achieve good vibration damping effect. Among them, a plurality of chambers 12 are regularly arranged in the main body 1 and surround outside the rotary shaft A at intervals along the axial direction to ensure that the damping particles 2 in their respective chamber 12 can move freely, thereby avoiding damping failure caused by excessive stacking of damping particles 2. And the multiple chambers 12 regularly surrounding the rotary shaft A can dampen the vibration of the active rotary shaft A in multiple directions at the same time, which has a good vibration damping and noise reduction effect, and greatly avoids the vibration interference on the terminal equipment and the power source equipment 4 during the transmission process of the rotary shaft A.

In one embodiment, the main body 1 is concave inward from positions near the lateral end surfaces to form chambers that are mutually independent. Among them, at least two layers of chambers 12 are arranged from the inside out in the direction going around the rotary shaft A. By configuring the independent chambers 12 that are separated with each other at positions close to the end surfaces of the main body 1 for accommodating and filling the damping particles 2, and by configuring at least two layers of chambers 12, along the direction away from the rotary shaft A, a vibration dispersing mode (spreading outward circumferentially from pipe A) suitable for the rotary shaft A is formed, and the multi-layer chambers 12 arranged along the dispersing direction work collaboratively to achieve a more efficient vibration damping method. Preferably, each layer has at least two chambers 12.

In particular, the sizes of the chambers 12 on different layers are different, and the chambers 12 on the outer layer are larger than the chambers 12 on the inner layer. With this configuration, the chambers 12 on the outer layer away from the rotary shaft have a better vibration damping effect to cope with the more severe vibration located at the centrifugal place. And the vibration damping effect of the multi-layer mode increases step by step, which is more suitable for rotary shaft A (such as the motor shaft) to reduce the torsional vibration generated when it rotates efficiently.

Preferably, chambers 12 are arranged symmetrically along the axial direction of rotary shaft A, and the main body 1 is concave from positions near both lateral end surfaces to form chambers 12 of the same dimension. The chambers 12 of the same dimension are arranged symmetrically along the laying direction of the rotary shaft A to enhance the vibration reduction effect. Additionally, such configuration is suitable for dispersing the lateral vibration generated when the rotary shaft A (e.g. push rod shaft) reciprocates efficiently, further ensuring the diversity of the vibration damping functions.

In one embodiment, preferably, the main body 1 is roughly hoop-shaped, and may be detachably arranged around the rotary shaft A. The main body 1 has at least two separable hoop elements 11, and the hoop elements 11 are connected to each other to form a complete main body 1. Among them, the hoop-shaped main body 1 is sleeved around the outer periphery of the rotary shaft A to ensure a tight fit between each other and improve the stability of vibration damping. In particular, there are two hoop elements 11 which roughly have a shape of semi-annular hoop element 11 to enable opening and closing, and the hoop elements 11 can be fitted and tightly fastened on the rotary shaft A, so that the vibration damping effect is stronger, and it is convenient for the disassembly and assembly of the main body 1 on the rotary shaft A.

Preferably, the hoop elements 11 each roughly has an arch bridge shape with hollowed inside. The arch bridge has a side cover plate 111, and the side cover plate 111 can be separated with the hoop element 11 to expose the respective chambers 12, accordingly. Since the side cover plate 111 is detachably arranged on the side of the hoop element 11, the user is able to supplement or replace the damping particles 2 in the inner cavity, which is efficient and easy to operate. When the side cover plate 111 is detached, the chambers 12 are concave inward from the lateral end surface of the hoop element 11, and when the side cover plate 111 covers the lateral end surface of the hoop element 11, the chambers 12 are closed correspondingly.

Preferably, damping particles 2 are granular material made of metallic, non-metallic or polymer composite material, and the shape of the granular material is a regular or irregular polyhedron. It should be noted that granular material is preferably iron-based particles, aluminum-based particles, nickel-based particles, tungsten-based particles, chromium-based particles, sodium-based particles, magnesium-based particles, manganese-based particles, calcium-based particles, copper-based particles, zinc-based particles, scandium-based particles, titanium-based particles, glass particles, oxide ceramics and so on. Different from ordinary solids, liquids and gases, the damping particles have the advantages of small size, high temperature resistance and high reliability, and can reduce the vibration of shaft A by dissipating energy via collisions between particles. Moreover, the granular material is specifically a sphere with a diameter of 0.001-20 mm, an ellipsoid with a length of both major and minor axes of 0.001-20 mm, a regular polyhedron with a side length of 0.001-20 mm, or an irregular polyhedron with a side length of 0.001-20 mm, etc.

In the present embodiment, due to the different radians and the distance from the inner diameter, the space size for accommodating the particles is also different. According to the design method to tune the quality, the particle material, particle size and filling rate are different for chambers with different internal space. For example, the chamber with smaller internal space is filled with metal alloy particles with heavier mass or smaller particle size, or the filling rate may also be appropriately increased, while the chamber with larger internal space is filled with metal alloy particles with lighter mass or larger particle size, or the filling rate may be appropriately reduced or the particles may be mixed with other particles with lighter overall weight.

In particular, the granular materials within the same chamber 12 may be made of different materials or have different shapes. By doing so, different vibration peaks can be eliminated. And different chambers 12 are filled with particles of different materials, particle sizes and filling rates to eliminate different vibration peaks and greatly improve the vibration damping and noise reduction performance of the shock absorber. It should be mentioned that the granular material in the same chamber 12 may be multivariate mixed particles made by mixing the above particles to improve the diversity of damping particles 2.

Among them, the filling rate of granular material in different chambers 12 varies. Specifically, the filling rate of damping particle 2 in chamber 12 is 35%-95%. If the filling rate in the chamber 12 is too low, the damping effect is poor, and if the filling rate is too high, the weight is increased. Preferably, the hoop elements 11 are made of a metal or hard polymer material.

In another preferred embodiment, the particle material of the damping particle 2 is spherical particle whose radius r satisfies the following conditions:

$$r = \frac{2\mu \rho g \left(\frac{d_1}{D}\right)}{5\omega d_2 K \left(1 + \frac{d_1 + 2d_2}{R}\right)}$$

Where $\mu$ is the coefficient of friction between the particle and the inner surface of the chamber 12. $\rho$ is the density of the particle. $d_1$ is the inner diameter of the hoop element 11. $d_2$ is the outer diameter of the hoop element 11. D is the difference between the outer diameter and the inner diameter of the hoop element 11. R is the diameter of the rotary shaft A and satisfies: $R \geq 2D$. $\omega$ is the first-order natural frequency of the shock absorber. $K_1$ is the stiffness coefficient of the particle. Among them, the surface friction coefficient is 0.01-0.99, the density of particles is 0.1-30 g/cm$^3$, the size of hoop element 11 and the size of rotary shaft A can be designed according to actual use, and the dimensional data can be directly measured. As can be seen from the above equation, the radius of the damping particle of the shock absorber is closely related to the physical parameters such as the size of the main body 1, the size of the rotary shaft A and so on, which provides guidance for the study of the damping mechanism and the design and optimization of the shock absorber, and has great practical application value.

Figure 25:
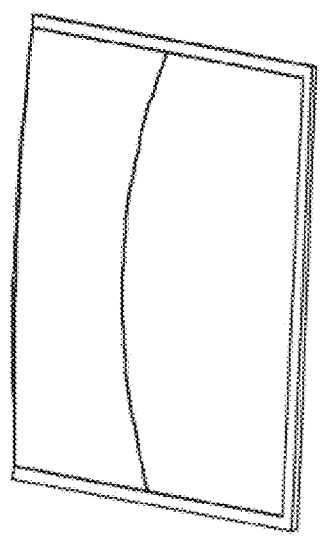
FIG. 25 is a structural schematic diagram of the damping bag of the shock absorber according to the second embodiment of the present disclosure.
Figure 26:
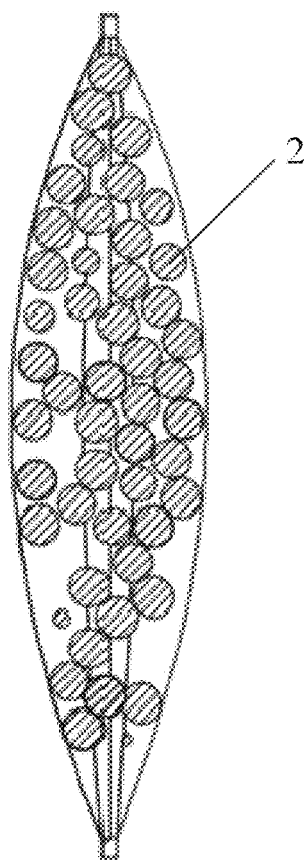
FIG. 26 is a cross-sectional view of FIG. 25 from one of the perspectives.
Figure 27:
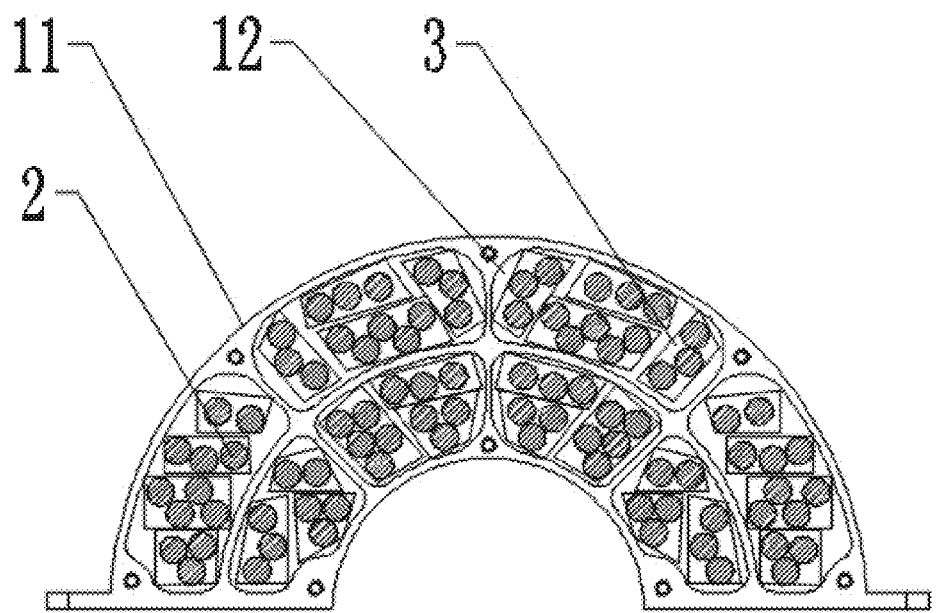
FIG. 27 is a structural schematic diagram of the damping bags and chambers of the shock absorber according to the second embodiment of the present disclosure.

Referring to FIGS. 25 to 27, in one embodiment, in order to eliminate the phenomenon that the granular material in the chamber 12 is squeezed out to the outer edge (the inertial force of the shaft A during transmission can cause the granular material to move along the moving direction to the inner wall of the chamber 12 to be compacted, such that the collision and friction between the granular material becomes smaller, affecting the energy dissipation effect). Specifically, the damping particles 2 with a predetermined quantity are packaged by the wrapping 3 to form a damping bag, and a plurality of damping bags are stacked in each chamber 12. By packaging the granular material with a predetermined quantity via the wrapping 3 to form a damping bag, and stacking the damping bags in the chambers 12 of the main body 1, the granular material can be gathered by bag filling to achieve the users preset form, so that the filling of particle damping 2 is more concentrated. Moreover, it can reduce the squeezing of granular materials to the outer edge (particles are squeezed to the edge of the chamber wall of chamber 12), so as to achieve a good vibration damping effect, simple structure, convenient operation, conducive to promotion and application. By filling the particles with packaging of the damping bag, not only the weight of the shock absorber can be reduced, but also the squeezing of granular materials to the outer edge can be reduced, thereby achieving a good vibration damping effect.

In a preferred embodiment, each damping bag is filled with the granular material of different predetermined quantity, and each chamber 12 is used to place a different number of damping bags respectively. Each damping bag is filled with the granular material of different predetermined quantity, so that the damping bag has different vibration damping effects. Moreover, different chambers 12 are filled with damping bags with different vibration damping effects and the number of damping bag is also different, so that each chamber 12 has diverse vibration damping effect to eliminate different vibration peaks, thereby greatly improving the vibration damping and noise reduction performance of the shock absorber.

In one embodiment, the wrapping 3 is a plastic bag having a cavity 31 for storing granular material and a sealable opening 32 that can be opened and closed and is an access to the cavity 31. By opening and closing the sealable opening 32 of the bag, the granular material can be added or replaced with other granular material correspondingly, so as to change the damping effect of the damping bag and meet the packaging needs of the damping bag. It should be mentioned that, in other embodiment, the material of the wrapping may also be plastic, rubber, latex, aluminum foil, nylon and the so on.

In particular, the filling rate of the damping bag in each chamber 12 varies, and filling rate of the damping bag in the chamber 12 is 40%-90%.

Figure 28:
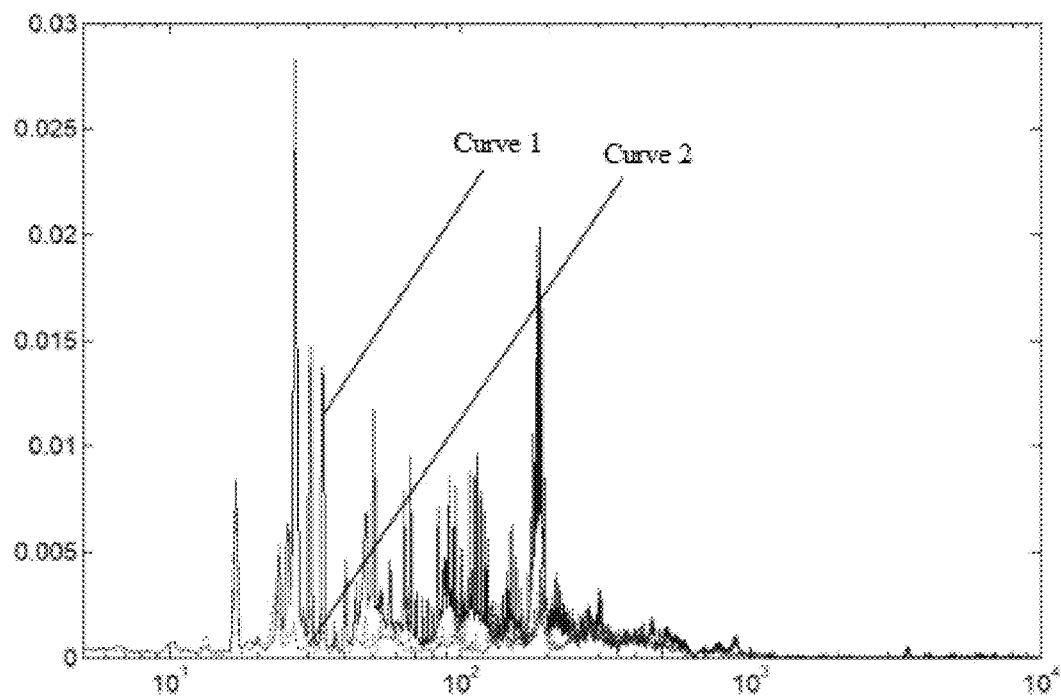
FIG. 28 is a diagram showing the comparison of the vibration damping effect of the shock absorber according to the second embodiment of the present disclosure.

Referring to FIG. 28 which is a diagram showing a comparison of the vibration damping effect of the shock absorber of the present disclosure. The shaft A is installed with shock absorber and vibration tests are performed on the transmission system and its environment to obtain the vibration spectrum curve before and after installation. In the figure, curve 1 represents the vibration situation when no shock absorber is installed, and curve 2 represents the vibration situation when the shock absorber is installed, wherein the total level value of vibration measured at no load (no shock absorber installed) is 96.5 dB, and the total level value of vibration measured after installing the shock absorber is 88.42 dB. Compared with the situation where the shock absorber has not been installed, the vibration of the shaft A installed with the shock absorber is greatly reduced.

Embodiment 3

Figure 29:
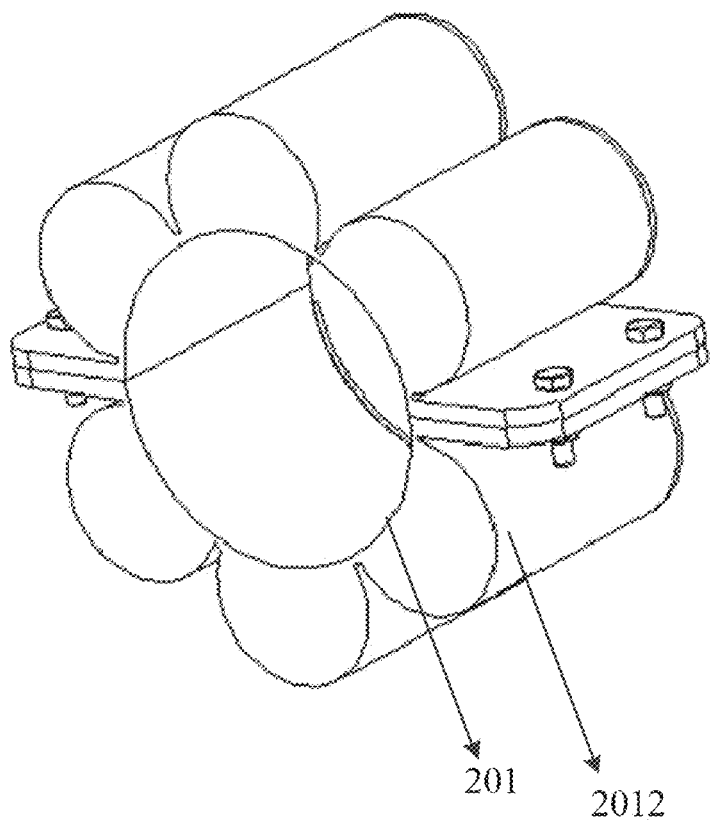
FIG. 29 is a structural schematic diagram of a shock absorber according to the third embodiment of the present disclosure.
Figure 30:
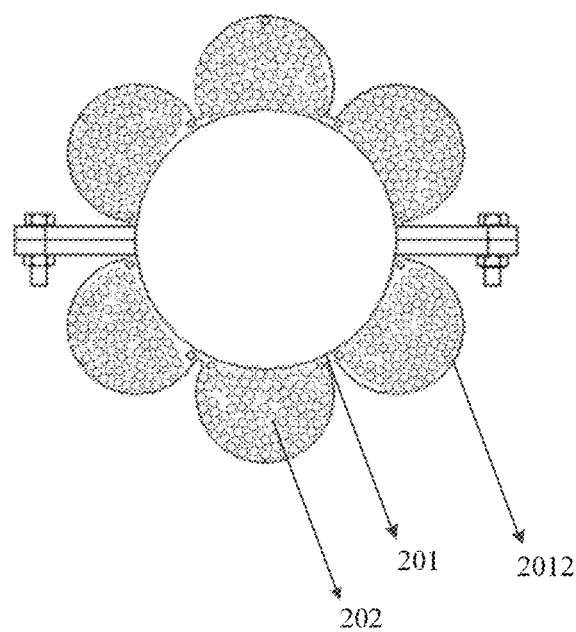
FIG. 30 is a cross-sectional view of the shock absorber according to the third embodiment of the present disclosure.

Referring to FIGS. 29 and 30 which show the schematic diagrams of a shafting hoop-type particle damping shock absorber according to a third embodiment of the present disclosure. Compared with the second embodiment, the difference of the present embodiment is that the plurality of chambers 2012 are distributed on the outer periphery of the main body 201. The chambers 2012 circumferentially circulate around the outer periphery of the main body 201 and are centrosymmetric, and the material, particle size and filling rate of the damping particles 202 contained in each chamber 2012 are the same.

Embodiment 4

Figure 31:
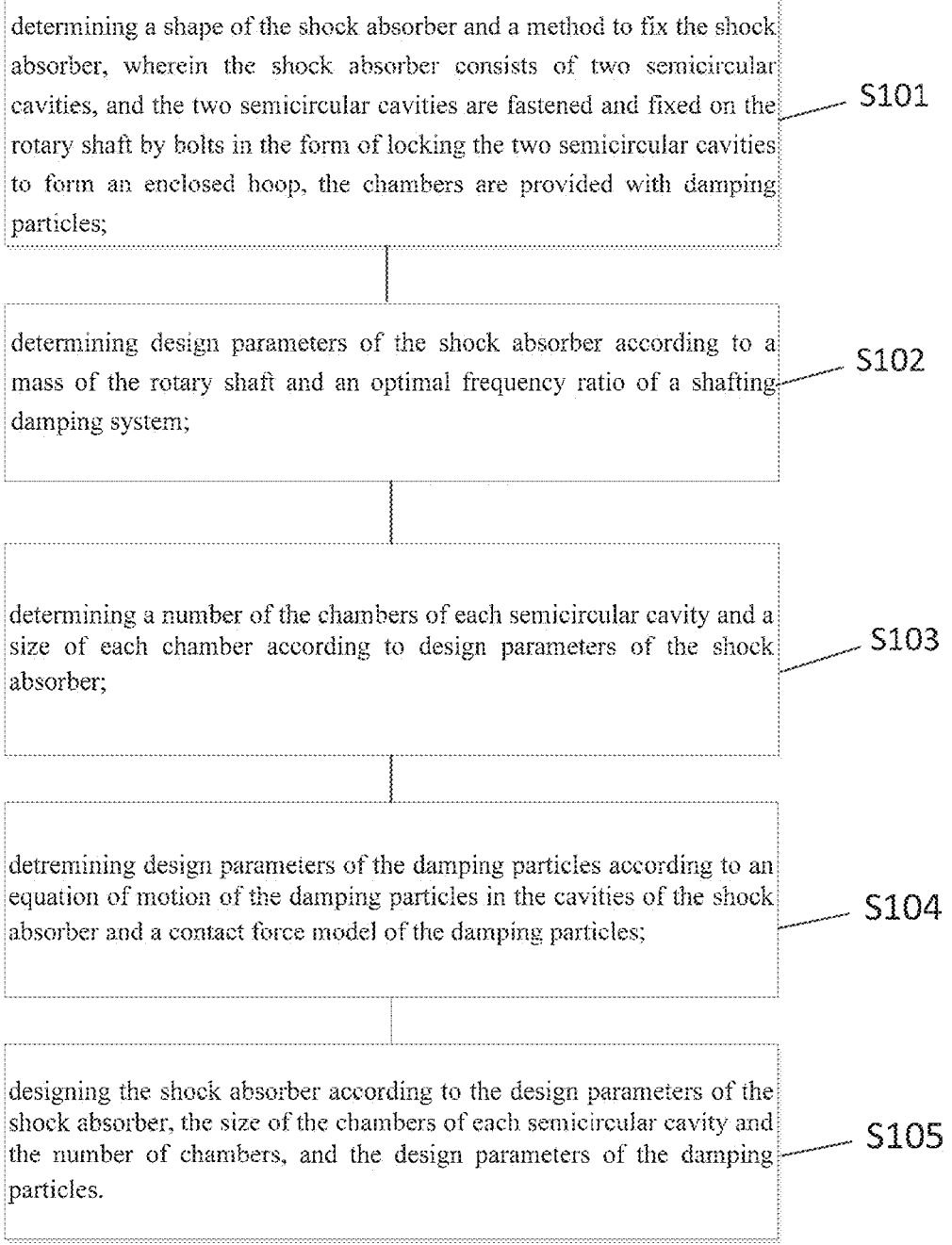
FIG. 31 is a flow chart showing the design method of a shafting hoop type particle damping shock absorber according to the fourth embodiment of the present disclosure.

Referring to FIG. 31, the fourth embodiment of the present disclosure provides a method for designing a shafting hoop-type particle damping shock absorber, which is used to determine at least one design parameter of the shafting hoop-type particle damping shock absorber of the embodiment 2 and the embodiment 3 described above, the method includes the following steps.

S101, determining a shape of the shock absorber and a method to fix the shock absorber, wherein the shock absorber consists of two semicircular cavities and a plurality of chambers configured in each of the semicircular cavity, and two semicircular cavities are fastened and fixed on the rotary shaft by bolts in the form of locking the two semicircular cavities to form an enclosed hoop. The chambers are provided with damping particles.

In the present embodiment, in order to not destroy the dynamic balance of the shafting system itself as much as possible, the shape of the particle damping shock absorber is formed by combining two semicircular cavities, and the shock absorber is mounted on the rotary shaft by bolts in the form of locking the two semicircular cavities to form an enclosed hoop.

S102, determining design parameters of the shock absorber according to a mass of the rotary shaft and an optimal frequency ratio of a shafting damping system.

In the present embodiment, when the natural frequency of the shock absorber is tuned to a similar frequency to the shafting excitation frequency, the structural vibration can be effectively suppressed, so the design parameters of the shock absorber can be determined based on this principle.

Specifically, the calculation formula of frequency ratio is:

$$\lambda a = \frac{1}{\sqrt{1+1.56\nu}}.$$

The excitation frequency of the shafting damping system is:
$\omega_z = \lambda_a \omega_0$ Where $\omega_0$ is the natural frequency of the shock absorber. The mass of the shock absorber is:

$$m_j = m_r + m_k \cdot m_d$$

is the mass of a mass block having equal volume of the empty cavity of the shock absorber, the mass of the damping particles $$m_k = \beta \left( m_d \Big/ \sqrt{3} \right) \cdot \nu$$

is the mass ratio of the mass of the shock absorber to the sum of mass of the shock absorber and mass of the rotary shaft, $$v = \frac{m_j}{m} \cdot \beta$$

is the correction coefficient, generally 0.85~0.95.

Assuming that the optimal frequency ratio is 1, the mass ratio v can be obtained. Since the mass m of the rotary shaft is known, the mass $m_j$ of the shock absorber can be obtained.

In the present embodiment, after obtaining the mass $m_j$ of the shock absorber, the stiffness $k_a$ of the shock absorber can be further obtained:

$$k_a = m_j \omega_z^2$$

In this way, the material of the corresponding shock absorber can be selected according to $k_a$.

In the present embodiment, the inner diameter of the shock absorber is the diameter of the installed shaft, according to the formulas given, the ideal mass of the shock absorber as a whole can be obtained. After selecting the material of the shock absorber, assuming that the internal cavity is solid, the outer diameter and axial length of the shock absorber can be initially formulated. The radial height of the chambers and the desired number of the chambers can be determined by the S103 which can further adjust the outer diameter and axial length of the shock absorber.

S103, determining a number of the chambers of each semicircular cavity and a size of each chamber according to design parameters of the shock absorber.

In the present embodiment, the collision of the damping particles and the container wall is beneficial to improve the high-order damping of the shock absorber and reduce the effect of the particles being squeezed to the outer edge, so it is necessary to divide the semicircular container to create sub-cavities. The sub-cavities can be called the controlled structure of the particle tuning mass, and the dimensions of the individual sub-cavity can be designed by the following formula:

$$\omega_i = \pi \frac{[(R_f - g)h_1]^{\frac{1}{2}}}{L} \left[1 - \frac{1}{6}\pi^2 \left(\frac{\alpha h_1}{L}\right)^2\right]$$

$$\omega_i = \pi \frac{[(R_f + g)h_1]^{\frac{1}{2}}}{L} \left[1 - \frac{1}{6}\pi^2 \left(\frac{\alpha h_2}{L}\right)^2\right]$$

$$R_f = 1.118 \times 10^{-5} \times N^2 \times R$$

In the above formulas:

$\omega_i$ is the first-order self-resonance frequency of the shock absorber structure. $h_1$ is the particle accumulation height in the sub-cavity when the damping particles are above the rotary shaft. $h_2$ is the particle accumulation height in the sub-cavity when the damping particles are under the rotary shaft. L is the length of the sub-cavity in the axial direction of the rotary shaft. $\alpha$ is the correction coefficient, the range is 0.7~1.0. $R_f$ is the relative centrifugal force at different speeds, its unit is g (9.8 m/s$^2$). N is the shaft speed. R is the centrifugal radius.

In the present embodiment, according to the above formulas, the length of the sub-cavity in the axial direction of the rotary shaft can be determined, and then the number of sub-cavity in the axial direction can be determined according to the size of the space for installing the shock absorber.

In addition, take the radial length of the shock absorber according to the above formula: h=1.15 max($h_1$, $h_2$). In this way, the design parameters of the shock absorber and the design parameters of the sub-cavities are obtained.

S104, determining design parameters of the damping particles according to an equation of motion of the damping particles in the cavities of the shock absorber and a contact force model of the damping particles.

In the present embodiment, the design parameters of the damping particles include the material, particle size, and filling rate of the damping particle. Specifically, step S104 includes the following steps.

First, establishing the equation of motion of the damping particles at a certain moment when the shock absorber rotates smoothly with the rotary shaft.

The equation of motion is expressed as follows:

$$\begin{cases} m_i \frac{d^2 P_i}{dt^2} = m_i(g + R_f \cos\beta) + m_i \omega^2 R + \sum_{i=1}^{k_1}(F_n + F_t) & \text{When particles are located at the lower semicircular part of the shock absorber} \\ m_i \frac{d^2 P_i}{dt^2} = m_i(R_f \cos\beta - g) + m_i \omega^2 R + \sum_{i=1}^{k_1}(F_n + F_t) & \text{When particles are located at the upper semicircular part of the shock absorber} \\ I_i \frac{d^2 \phi_i}{dt^2} = \sum_{i=1}^{k_1} T \end{cases}$$

where $m_i$ and $l_i$ represent the mass and moment of inertia of particle i.

$P_i$ and $\varphi_i$ respectively represents the translational displacement and angular displacement vector of particle i. g is the acceleration of gravity, and $R_f \cos\beta$ is the component of particle i relative to centrifugal force in the direction of gravity. T is the moment of force acting on particle i. $k_i$ is the total number of particles in contact with particle i. $\omega$ is the angular acceleration of particle i. R is the displacement vector of particle i and particle j center.

Figure 32:
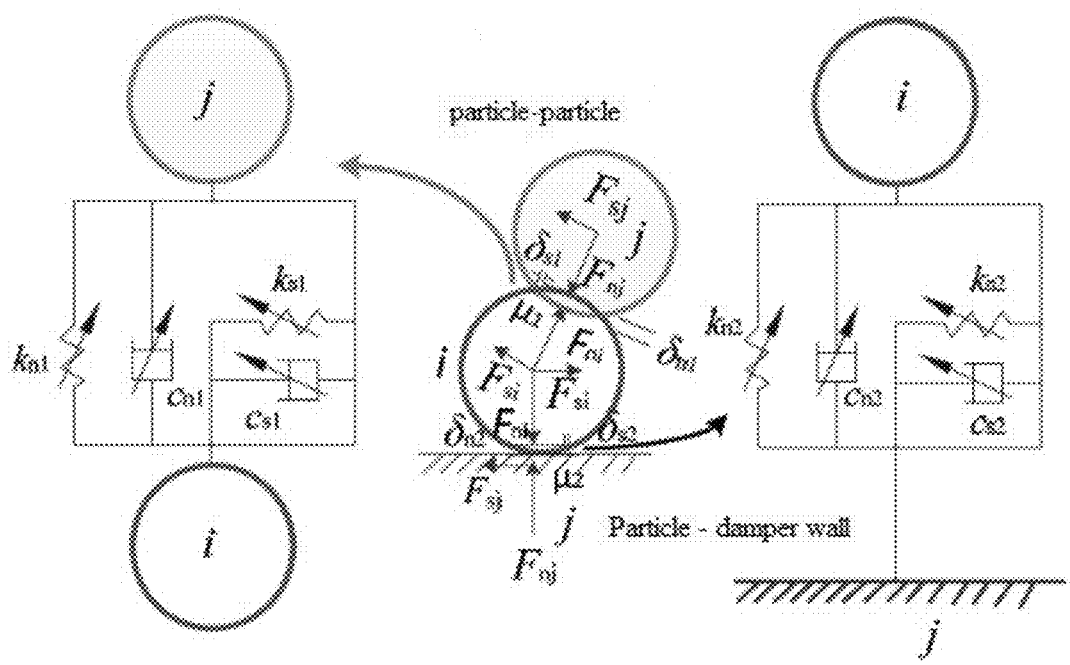
FIG. 32 is a schematic diagram showing the contact force model of the damping particles.

Next, based on Hertz contact theory, a contact force model of the damping particles is established, as shown in FIG. 32.

Then, based on the equations of motion and the contact force model, the overall energy consumption of the particle system is established.

Among them, at the initial moment, the coordinates of particles i and j in the spatial coordinate system are set as $(x_i,y_i,z_i)$ and $(x_j,y_j,z_j)$, the radii of the two particles are $r_i$ and $r_j$, the relative displacement vector between particle i and j is $D_{ij}$, and the relative displacement vector between particle i and the inner cavity wall of the shock absorber is $D_{iw}$.

When $|D_{ij}|<r_i+r_j$, particle i and j collides. When $|D_{iw}|<r_i$, a collision occurs between particle i and the damping wall. When a collision occurs, the amount of normal overlap between particles or between particles and the inner cavity wall of the shock absorber is expressed as:

$$D_n = \begin{cases} r_1 + R_j - D_{ij} & \text{Between particles} \\ r_i - D_{iw} & \text{Between particles and the inner cavity wall} \end{cases}$$

Normal contact force includes normal elastic contact force and normal damping contact force, which are expressed as:

$$F_{kn} = -k_n D_n$$

$$F_{cn} = -c_n v_n$$

$v_n$ is the normal relative velocity, $k_n$ is the elastic coefficient, and $c_n$ is the damping coefficient. Both $k_n$ and $c_n$ are derived from Hertz contact theory and are expressed as:

$$k_n = \frac{4}{3}\left(\frac{1-v_i^2}{E_i} + \frac{1-v_j^2}{E_j}\right)^{-1}\left(\frac{r_i+r_j}{r_i r_j}\right)^{-\frac{1}{2}}$$

$$c_n = 2\sqrt{mk_n}$$

Among them, E and ν are the Young's modulus and Poisson's ratio of the particle material, respectively. When the particle material and radius are the same, $k_n$ is simplified to:

$$k_n = \frac{\sqrt{2r}E}{3(1-v^2)}$$

So the normal resultant force between the two particles is expressed as:

$$F_{n1} = F_{kn} + F_{cn} = \frac{\sqrt{2r}E}{3(1-v^2)}(2r - D_{ij}) + 2\sqrt{mk_n}\, v_n$$

The tangential contact force includes the tangential elastic contact force and the tangential damping contact force, which are expressed as:

$$F_{kt} = -k_t D_t$$

$$F_{ct} = -c_t v_t$$

where $D_t$ is the tangential relative displacement and $v_t$ is the tangential relative velocity. Both $k_t$ and $c_t$ are derived from Hertz contact theory and are expressed as:

$$k_t = 8|D_n|^{\frac{1}{2}}\left(\frac{1-v_i^2}{G_i} + \frac{1-v_j^2}{G_j}\right)^{-1}\left(\frac{r_i+r_j}{r_i r_j}\right)^{-\frac{1}{2}}$$

$$c_t = 2\sqrt{mk_t}$$

where G is the shear modulus of the granular material. When the particle material and radius are the same, $k_t$ is simplified to:

$$k_t = \frac{2\sqrt{2r}G}{(1-v^2)}|D_n|^{\frac{1}{2}}$$

The tangential resultant force between the two particles is expressed as:

$$F_{t1} = F_{kt} + F_{ct} = -\frac{2\sqrt{2r}G}{(1-v^2)}|D_n|^{\frac{1}{2}}D_t + 2\sqrt{m\frac{2\sqrt{2r}G}{(1-v^2)}|D_n|^{\frac{1}{2}}}\, v_t$$

The tangential friction can be obtained from the Coulomb friction model, expressed as:

$$F_{ts} = -\mu|F_n|v_t/v_t|$$

It is judged that when $|F_{t1}|>|F_{ts}|$, that is, the tangential resultant force is greater than the maximum static friction force, there is relative sliding between the particles, then $|F_{t1}|=|F_{ts}|$.

Similarly, the contact force between the particles and the inner wall of the damping shock absorber is expressed as:

$$\begin{cases} F_{n2} = k_{n2} + r_j - D_{ij} & \text{Normal} \\ F_{c2} = -D_{iw} & \text{Tangential} \end{cases}$$

Particle damping energy consumption can be classified as two kinds: collision energy consumption and friction energy consumption. When any two particles i and j collide and contact, the collision energy consumption is expressed as:

$$\Delta E_e = \frac{m_i m_j}{2(m_i + m_j)}(1-e^2)|\Delta v|^2$$

where e is the recovery coefficient of the particle. $\Delta v$ is the relative velocity of the two particles before the collision.

The friction force work determines the amount of frictional energy consumption, which is expressed as:

$$\Delta E_f = \mu F_{nij} \Delta S_\mu$$

where μ is the friction factor between the two particles, $F_{nij}$ is the normal pressure of the two particles, and $\Delta S_\mu$ represents the tangential relative displacement of the two particles. When there is a collision or friction between the particles and the damping shock absorber, the energy consumption also follows the above calculation method, so the overall energy consumption of the particle system can be expressed as:

$$E = \Sigma \Delta E_e + \Sigma \Delta E_f$$

Finally, according to the overall energy consumption of the particle system, the material, particle size and filling rate of particle damping are determined by simulation verification.

In the present embodiment, the energy consumption of the particle system is directly affected by the mass of a single particle, recovery coefficient, relative velocity, tangential relative displacement, friction factor, etc., and is manifested in practice as particle material, particle size, filling rate.

Therefore, the parameters of material, particle size and filling rate of particle damping can be initially selected.

(1) Granular Material

Particle material is one of the most important factors affecting the energy dissipation effect of damping particles, and the optimal particle material can be obtained by simulation verification by discrete element simulation software.

TABLE 1

| Particle category | Density (g/cm$^3$) | Elastic modulus (GPa) | Poisson's ratio | Recovery factor (Particle-Particle) |
|---|---|---|---|---|
| Iron-based alloy | 7.8 | 210 | 0.28 | 0.63 |
| Tungsten-based alloy | 18.2 | 400 | 0.28 | 0.37 |
| Aluminum-based alloy | 2.7 | 72 | 0.3 | 0.1 |

Table 1 shows the parameters of three types of damping particles, as shown in Table 1. In the simulation calculation, the particle size of the hoop-type particle damping shock absorber is set to be 3 mm, the filling rate is 90%, and the shaft diameter D is 50 mm. The energy dissipation values of the different particle materials are shown in FIG. 33.

Figure 33:
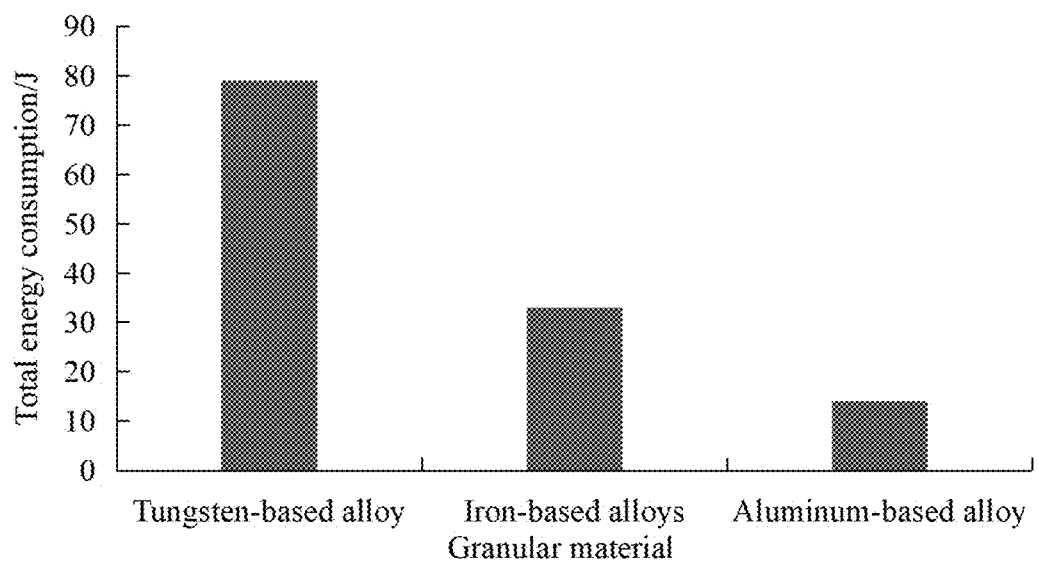
FIG. 33 is a simulation comparison diagram showing the total energy consumption of damping particles of different materials.

As can be seen from FIG. 33, among the three materials, tungsten-based alloy particles have larger energy consumption.

(2) Damped Particle Size

The size of the damping particles can be expressed by:

$$r = \frac{2\mu\rho g\left(\frac{d_1}{D}\right)}{5\omega d_2 K\left(1 + \frac{d_1 + 2d_2}{R}\right)}$$

μ is the coefficient of friction between the particle and the inner surface of the chamber, and ρ is the density of the particle. $d_1$ is the inner diameter of the shock absorber. $d_2$ is the outer diameter of the shock absorber. D is the difference between the outer and inner diameters of the shock absorber. R is the diameter of the rotary shaft and satisfies: R≥2D. ω is the first-order natural frequency of the shock absorber. $K_1$ is the stiffness factor of the particles. Among them, the surface friction coefficient μ is 0.01-0.99, and the density ρ of particles is 0.1-30 g/cm$^3$.

Similarly, discrete element simulation software is used for verification, a material is selected, except that the particle radius is different, other simulation conditions are the same as the above steps.

Figure 34:
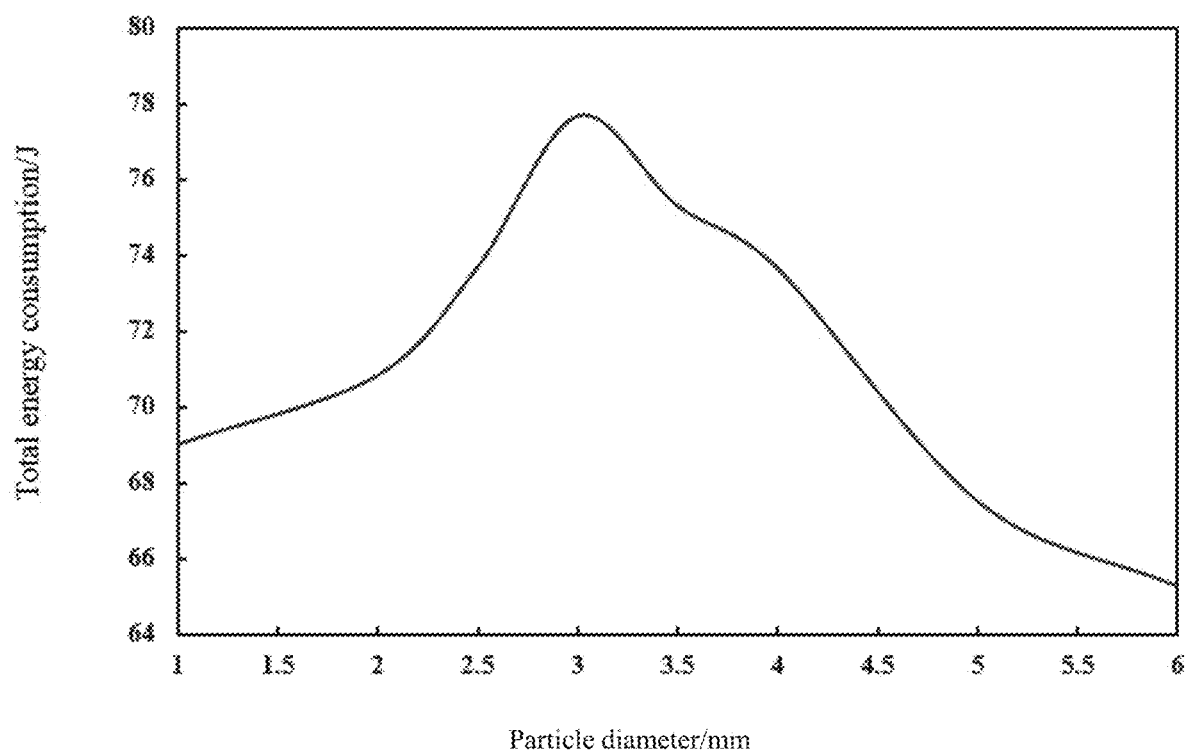
FIG. 34 is a simulation comparison diagram showing the total energy consumption of damping particles with different particle sizes.

The simulation results are shown in FIG. 34, and it can be seen that there is a larger energy consumption at a particle size of about 3 mm.

(3) Filling Rate

When at lower speeds g >$R_f$ cos β, the damping particle group in the shock absorber moves up and down between the inner diameter surface and the outer diameter surface of the shock absorber as a whole with the rotation of the rotary shaft to create collision and friction, so as to dissipate energy.

When at higher speeds g<<$R_f$cos β, the damping particles in the shock absorber are squeezed on the outer diameter surface of the shock absorber, and under vibration excitation, the energy dissipation mainly happens during the collision and friction between particles and particles, particles and the cavity wall.

Therefore, when there are few particles, although the overall moving distance of the particle group in the cavity becomes longer and the energy consumption is greater, the number of collisions between particles and particles with the wall is reduced, so the overall energy consumption is unsatisfactory.

However, when the quantity of the particles is excessive, the overall moving distance of the particle group becomes shorter due to over-stacking and squeezing in the cavity, and the energy consumption becomes smaller. However, the number of collisions between particles and particles with the wall increases, but the overall energy consumption is also unsatisfactory.

Therefore, discrete element software is used to verify the filling height of particles in step two while further optimizing the filling rate.

Figure 35:
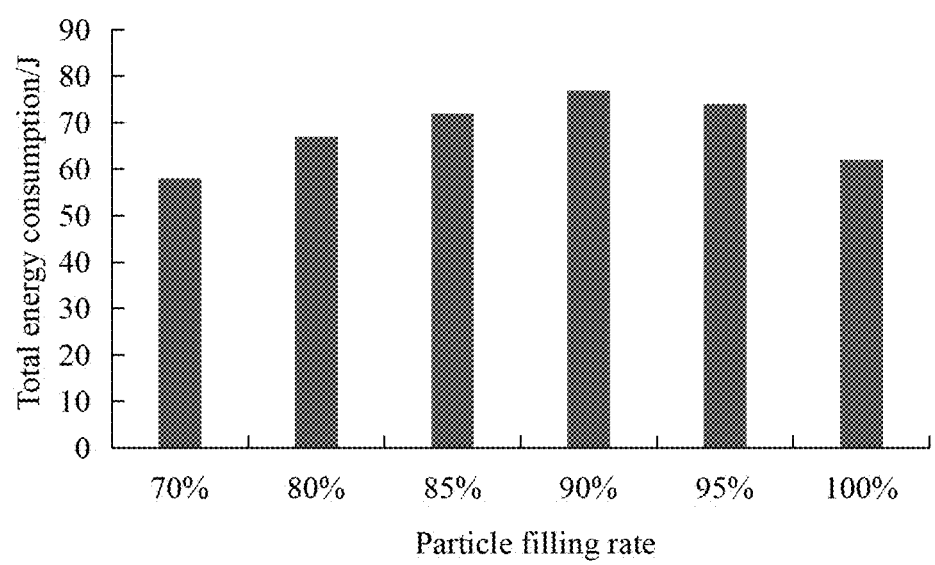
FIG. 35 is a simulation comparison diagram showing the total energy consumption of different filling rates.

The simulation results are shown in FIG. 35, and it can be seen that it has a larger energy consumption at a filling rate of about 90%.

S105, designing the shock absorber according to the design parameters of the shock absorber, the size of the chambers of each semicircular cavity and the number of chambers, and the design parameters of the damping particles.

In the present embodiment, based on the above obtained design parameters, the shock absorber can be designed, so as to obtain a shock absorber with the optimal vibration damping effect.

In summary, according to the method for designing the shafting hoop-type particle damping shock absorber provided in the present embodiment, the various processes that can affect energy consumption in the shafting system are analyzed, and the corresponding motion equations are established, such that the design parameters of the shock absorber that have the largest total energy consumption of the system can be obtained, and then the shock absorber with the optimal vibration damping effect can be designed.

Preferably, the method further includes the following steps.

The dynamic balance test may be carried out on the shock absorber to reduce the influence of the hoop on the dynamic imbalance of the shafting system.

Preferably, the method further includes the following steps.

According to the total energy consumption of the system, the roughness of the shock absorber material and the contact surface between the shock absorber and the rotary shaft is optimized to improve the energy consumption effect of the shock absorber. The total energy consumption of the system is calculated by the following method.

Figure 36:
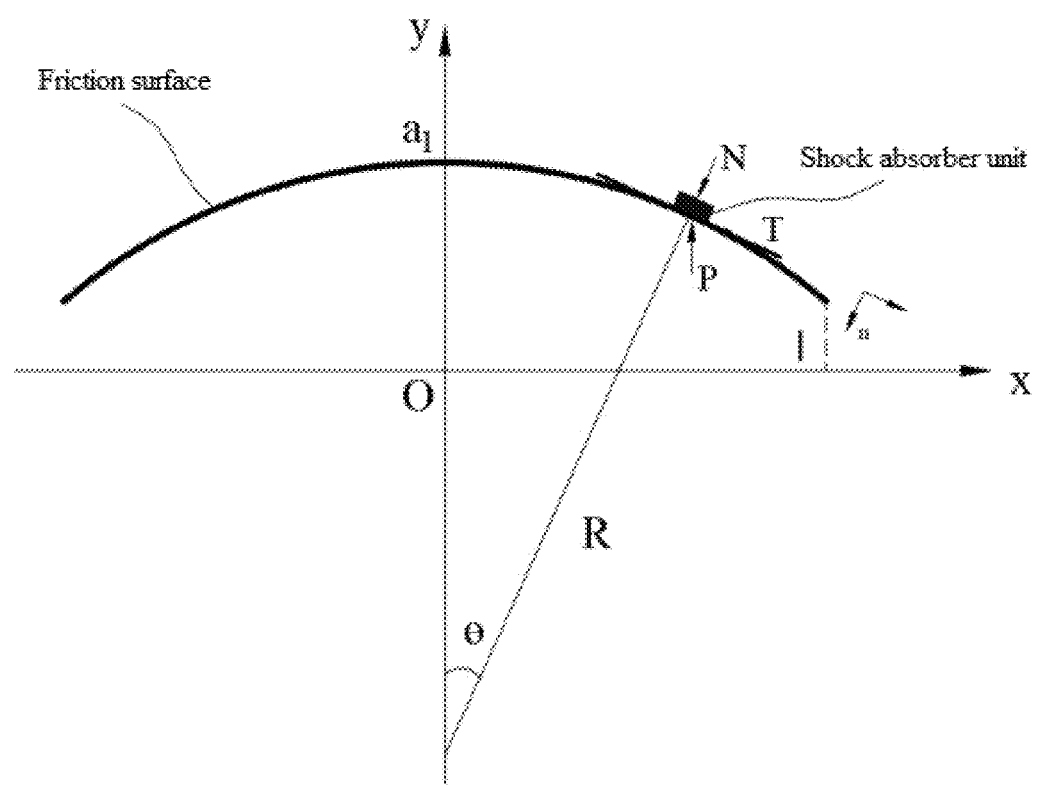
FIG. 36 is a schematic diagram showing the friction force when the hoop rotates with the shaft.

As shown in FIG. 36, when the hoop rotates with the rotary shaft, the rotating friction surface is defined by the function y(x).

$$y(x) = \sqrt{R^2 - x^2} + a_1 - R$$

The sliding friction force caused by tangent movement of the arc surfaces is:

$$F_f = \begin{cases} \text{sgn}(\dot{x})\mu N & \text{Slide in the direction of rotation} \\ \mu N & \text{Axial sliding} \end{cases}$$

μ is the coefficient of friction and sgn($\dot{x}$) is a sign function of $\dot{x}$.

Relationship between stress and strain of shock absorber material:

$$\sigma = k_a \varepsilon + \eta \varepsilon$$

$k_a$ and η are the stiffness and tangential damping of the shock absorber, respectively.

$$\varepsilon = \frac{\delta}{L}$$

L is the contact arc length between the inner diameter of the single side of the shock absorber and the shaft.

Amount of deformation $\delta = a_1 - y(x) + \Delta_0$, $\Delta_0$ is the initial compression amount.

Elastic force P=Aσ, A is the contact area between the single side of the shock absorber and the shaft, namely:

$$P = \frac{A}{L}[(a_1 - y(x) + \Delta_0) - \eta y'(x)]$$

Axial force generated:

$$F_h = \frac{A}{L}[k_a(a_1 - y(x) + \Delta_0) - \eta y'(x)][\text{sgn}(\dot{x})\mu + y'(x)]$$

The work done at a certain point of the inner diameter of the shock absorber in the rotation direction of shaft is:

$$\Delta E_z = P\Delta S_1 + F_f \Delta S_1$$

The work done in the rotation direction of the shaft is:

$$\Delta E_h = F_h \Delta S_2 + F_f \Delta S_2 + F_j \Delta S_2$$

$\Delta S_1$, $\Delta S_2$ are the displacements of a certain point on the inner diameter of the shock absorber in the rotation direction and the axial direction, respectively. $F_j$ is the axial excitation force of the rotary shaft.

So the total energy consumption is:

$$E = \Sigma \Delta E_z + \Sigma \Delta E_h$$

The above disclosure merely contains preferable embodiments of the present disclosure, which should certainly not be used to limit the scope of protection of the present disclosure. Those of ordinary skill in the art can understand all of or part of the processes of implementing the above embodiments, and the equivalent changes made according to the claims of the present disclosure still fall within the scope of the present disclosure.

INDUSTRIAL PRACTICALITY

The present disclosure may be applied to a pipe or shaft for damping vibration.

What is claimed is:

1. A damping shock absorber, comprising: a pipe and a plurality of shock absorbers disposed on the pipe, wherein each of the shock absorbers comprises a main body sleeved on an outer periphery of the pipe and a damping medium filled in the main body; the main body is provided with an inner cavity, and the inner cavity is divided into a plurality of chambers for placing the damping medium separately;

each of the shock absorbers is connected to an external support bracket, and the external support bracket is vertically arranged between the shock absorber and a mounting plane, so that a first end of the external support bracket is connected to a side of the shock absorber, a second end of the external support bracket is configured on the mounting plane; wherein the damping shock absorber further comprises buffer brackets, a plurality of the buffer brackets spaced apart are arranged between different shock absorbers along a pipe laying direction, for supporting the pipe and suspending the pipe above the mounting plane.

2. The damping shock absorber according to claim 1, wherein the damping medium is a granular material, and the granular material with a predetermined amount is packaged by a wrapping to form a damping bag, and a plurality of the damping bag are configured with different filling rates and stacked and placed in the inner cavity.

3. The damping shock absorber according to claim 1, wherein the main body is roughly in the shape of a hoop, and the inner cavity is divided by an isolation member, so as to correspondingly form the chambers that are mutually independent, wherein the chambers are spaced apart along a direction around the pipe.

4. The damping shock absorber according to claim 1, wherein two end portions of the pipe are respectively connectable to an external pipe fitting, the pipe is a flexible pipe, and the shock absorbers are detachably configured to end portions of the flexible pipe at positions close to the external pipe fitting.

5. A method for designing vibration reduction of a piping system, comprising:

performing vibration test for a piping system to be treated in a working state to determine a main frequency band of a vibration distribution and a frequency range of a sweep test of the piping system;

performing a modal dynamics simulation of an established piping system model according to a type of the piping system to obtain a modal mode shape of the piping system;

determining an installation position of a shock absorber model in the piping system model according to the obtained main frequency band of the vibration distribution of the piping system and the modal mode shape of the piping system, and setting the shock absorber model in the installation position to obtain a vibration damping system model; and performing simulation on the vibration damping system model by finite element and discrete element coupling according to the frequency range of the sweep test to determine an optimal value of each configuration parameter of the shock absorber model, and designing vibration reduction based on the optimal value of the configuration parameter.

6. The method for designing vibration reduction of the piping system according to claim 5, wherein the step of determining the installation position of the shock absorber model in the piping system model according to the obtained main frequency band of the vibration distribution of the piping system and the modal mode shape of the piping system, and setting the shock absorber model in the installation position to obtain a vibration damping system model, further comprises:

obtaining maximum vibration point of a pipeline under different orders according to the modal mode shape of the piping system and the main frequency band of vibration distribution;

installing the shock absorber model to the piping system model at the maximum vibration point of corresponding order to obtain the vibration damping system model; wherein the shock absorber dissipates vibration energy through inelastic collision and friction between particles, and the shock absorber being installed to the piping system model at the maximum vibration point of corresponding order can increase the number of collision of the particles and the friction energy generated.

7. The method for designing vibration reduction of the piping system according to claim 5, wherein the configuration parameters of the shock absorber model comprise at least one of the following: number of chambers of the shock absorber, particle filling method, particle material, particle diameter, particle filling rate, and particle surface friction factor; the step of performing simulation on the vibration damping system model by finite element and discrete element coupling according to the frequency range of the sweep test to determine an optimal value of each configuration parameter of the shock absorber model, and designing vibration reduction based on the optimal value of the configuration parameter, further comprises:

importing the vibration damping system model into the finite element and discrete element software, using grid division and defining a mesh size and a density degree according to geometric sizes of the shock absorber model, wherein the grid division using tetrahedral elements;

treating the particle system in the shock absorber model as several discrete element bodies, and performing calculation using a discrete element method;

treating the pipeline and its supporting structure as continuous element entities, and performing simulation calculation by a finite element method, wherein internal stress and deformation of each mesh element of the finite element are solved by an implicit time format linear finite element method, the discrete element method is used to calculate the excitation state of the particle system in the shock absorber under the excitation of the piping system structure, and the damping force of the particle system on the shock absorber structure is calculated, then through the nodal conversion method based on shape function, the damping force is converted into the finite element of the piping system model, and the particle damping force of the entire simulation time is obtained by repeating multiple time steps;

setting a frequency range of sweeping excitation of the pipeline system model of the finite element and discrete element coupling simulation analysis according to the frequency range of the sweep test to simulate the vibration excitation of the piping system under the working state, wherein finite element and discrete element coupling simulation is performed for different number of chambers, different particle materials, different particle diameters, and different particle filling rates, taking a total effective value of structural response acceleration under pipeline sweep excitation as a measurement standard, the optimal values of the configuration parameters of the shock absorber under different piping system parameters are obtained.

8. The method for designing vibration reduction of the piping system according to claim 7, wherein the step of converting the damping force into the finite element of the piping system model through the nodal conversion method based on shape function, further comprises:

dividing the shock absorber model of discrete element into triangular shell elements when the piping system model is tetrahedral meshed, wherein during the division process, a one-to-one correspondence of mesh elements of the geometric element body in the discrete element calculation and the finite element calculation should be guaranteed, that is, the element ID and node number in the discrete element calculation and the finite element calculation are consistent, the tetrahedral element consists of four triangular shell elements;

synthesizing the particle damping force on each element ID on a local coordinate system based on element ID numbers on triangular shell elements simulated by the discrete element method, and obtaining the force of each triangular shell element; wherein the step of synthesizing the particle damping force on each element ID on a local coordinate system based on element ID numbers on triangular shell elements simulated by the discrete element method, and obtaining the force of each triangular shell element further comprises:

performing equivalent displacement of the contact force of planar triangular shell elements in discrete elements;

calculating equivalent nodal force of the triangular shell element in the finite element;

converting the force of the boundary particle and the tetrahedral element in the shock absorber to the corresponding node designation according to the contact force and the equivalent nodal force, expressing the damping effect of the particle material by the damping force at the time using the element ID number and the element node number as the link, so as to establish the coupling effect of the discrete element calculation method and the finite element calculation method;

wherein in the step of performing equivalent displacement of the contact force of planar triangular shell elements in discrete elements:

for a three-node triangular planar element, and M particles acting on the triangular shell element, the contact force is calculated as follows:

for a local coordinate system (x,y,z) located at a center P point of an x-y plane, let it coincide with the plane of the triangular shell element; then $u_{ij}$ is a unit vector from point i to point j, and $u_{ik}$ is a unit vector from points i to point k; a unit normal vector n of the planar triangular shell element is:

$$\vec{n} = \frac{\vec{u_{ij}} \times \vec{u_{ik}}}{|\vec{u_{ij}} \times \vec{u_{ik}}|}$$

an x-axis direction of the local coordinate system is consistent with $u_{ij}$, and $\vec{u_x}, \vec{u_y}, \vec{u_z}$ of the local coordinate system can be expressed as:

$$\vec{u_x} = \vec{u_{ij}}, \ \vec{u_y} = \vec{n} \times \vec{u_x}, \ \vec{u_z} = \vec{n}$$

a relationship between the local coordinate system and a global coordinate system is:

$$\{x,y,z\}^T = [T_{trans},1]\{X,Y,Z\}^T$$

$$[T_{trans},1] = [\{\vec{u_x}\}\{\vec{u_y}\}\{\vec{u_z}\}]^T$$

for the vibration response of the piping system structure, each node in the piping system has six degrees of freedom, including three displacements and three angles, a displacement matrix $\{U_{6\times 1}\}$ is related to it by shape function $[N]_{6\times 18}$ and node displacement $\{A\}_{18\times 1}$:

$$\{U\}_{6\times 1}=[N]_{6\times 18}\{A\}_{18\times 1}$$

wherein, $\{U\}^T=\{u_x,u_y,u_z,\theta_x,\theta_y,\theta_z\}$;

$$\{A\}^T=\{u_{xi},u_{yi},u_{zi},\theta_{xi},\theta_{zi}\ldots u_{xk},u_{yk},u_{zk},\theta_{xk},\theta_{yk},\theta_{zk}\}$$

the external virtual work induced by the contact force is:

$$\delta W = \sum_{m=1}^{M}\{\delta U_m\}_{1\times 6}^T \overrightarrow{\{F_{con,m}\}}_{6\times 1} = \{\delta A\}_{1\times 18}^T \sum_{m=1}^{M}\{N_m\}_{18\times 6}^T \overrightarrow{\{F_{con,m}\}}_{6\times 1}$$

wherein con, $\overrightarrow{\{F_{con,m}\}}_{6\times 1}$ is the contact force vector acting on the contact point m in the local coordinate system; m refers to the point of contact; M is the number of contact points of the particle acting on the planar triangular element;

in this case, the equivalent nodal forces in the local coordinate system:

$$\{\overrightarrow{F}_{con,\,nodal}\}_{18\times 1}=\Sigma_{m=1}^M\{N_m\}_{18\times 6}^T\overrightarrow{\{F_{con,m}\}}_{6\times 1}$$

the contact force in the local coordinate system is converted to the contact force in the global coordinate system:

$$[T_{trans,2}]_{6\times 6} = \begin{bmatrix} [T_{tran,1}] & 0 \\ 0 & [T_{tran,1}] \end{bmatrix}$$

the nodal forces in the local coordinate system are converted by the following formula:

$$[T_{trans,3}]_{18\times 18} = \begin{bmatrix} [T_{tran,2}] & 0 & 0 \\ 0 & [T_{tran,2}] & 0 \\ 0 & 0 & [T_{tran,2}] \end{bmatrix}$$

the contact force of the nodes under the global coordinate system is obtained:

$$\{\overrightarrow{F}_{con,nodal}\}_{18\times 1} = \sum_{m=1}^{M}[T_{trans,3}]_{18\times 18}^T\{N_m\}_{18\times 6}^T[T_{trans,2}]_{6\times 6}^T\{F_{com,m}\}_{6\times 1}.$$

9. The method for designing vibration reduction of the piping system according to claim 8, wherein the equivalent node force of the triangular shell element is obtained by respectively displacing a concentrated force, a surface force and a volume force acting on the triangular shell element to the node, and then synthesizing the forces on each node, after calculating the equivalent nodal forces of all elements of an elastomer, all the equivalent nodal forces are gathered to obtain an overall structural nodal load array;

wherein, the magnitude of the equivalent nodal force should be determined according to the principle of imaginary displacement, that is, the work done by the equivalent nodal force is equal to the work done by the three forces acting on the element on any imaginary displacement; namely:

$$(\{\sigma^*\}^e\{R\}^e=\{f^*\}^T\{G\}+\int\{f^*\}^T\{q\}tds+\iint\{f^*\}^T\{p\}tdxdy$$

tn the above equation, a left part of the equal sign represents the imaginary work done by the equivalent nodal force $\{R\}^e$ of the triangular shell element, the first item on the right side of the equal sign is the imaginary work done by the concentrated force load $\{G\}$, the second iterm represents the imaginary work done by the surface force $\{q\}$, the third iterm represents the imaginary work done by the volumetric force $\{p\}$, tis the thickness of the element, which is assumed to be constant;

the imaginary displacement of the points within the triangular shell element is:

$$\{f^*\}=[N]\{\sigma^*\}^e$$

so there are:

$$(\{\sigma^*\}^e)^T\{R\}^e=(\{\sigma^*\}^e)^T[N]^T\{G\}+\int[N]^T\{q\}tds+\iint[N]^T\{p\}tdxdy$$

the multiplication of $[N]^T\{G\}$ on the right on the right side of the equation by the imaginary displacement of the node is the imaginary work done by the concentrated force, which is recorded as $\{F\}^e$, which represents the equivalent nodal force obtained by displacing the concentrated force load on the element to the node, $\int[N]^T\{q\}tds$ is the equivalent nodal force obtained by displacing the surface force on the triangular shell element to the node, which is recorded as $\{Q\}^e$, $\iint[N]^T\{p\}tdxdy$ is the equivalent nodal force obtained by displacing the volume force on the element to the node, which is recorded as $$\{P\}^e;$$

so there is:

$$[R]^e=\{F\}^e+\{Q\}^e+\{P\}^e$$

for this, the load array can be written as:

$$\{R\} = \sum_{e=1}^{N}(\{F\}^e + \{Q\}^e + \{P\}^e) = \{F\} + \{Q\} + \{P\}$$

for the concentrated force equivalent load array, the equivalent nodal forces of each element are synthesized point by point and arranged in the order of node numbers, which can form the concentrated force equivalent load array of the elastomer, that is:

$$\{F\}=\Sigma_{e=1}^N\{F\}^e$$

wherein, $\{F\}^e=(N_i)_c\{G\}$, $(N_i)_c$ is the value of the shape function at the point of the concentration force;
equivalent nodal force array:

$$\{F\}^e=[F_{ix}F_{iy}F_{jx}F_{jy}F_{mx}F_{my}]^T$$

the imaginary displacement of the element node is:

$$\{\sigma^*\}^e=[U_i^*V_i^*U_j^*V_j^*U_m^*V_m^*]^T$$

correspondingly, for the surface force load, the surface force acting on the boundary of the triangular shell element is displaced to the node, that is, the equivalent nodal force of the surface force of each triangular shell element can be synthesized point by point, and arranged in the order of node numbers, which forms the equivalent load array of the surface force of the elastomer:

$$\{Q\}=\Sigma_{e=1}^N\{Q\}^e$$

for the equivalent load array of volume forces, the equivalent of the volume forces of the triangular shell elements are synthesized at each node, and is arranged in the order of node numbers to form:

$$\{P\}=\Sigma_{e=1}^{N}\{P\}^{e}$$

the force between the boundary particle and the tetrahedral element in the shock absorber is converted to the corresponding node designation, and the damping effect of the particle material is expressed by the damping force at the moment with the element ID number and the element node number as the link, so as to establish the coupling effect of the discrete element calculation method and the finite element calculation method.

10. A damping shock absorber, comprising: a main body sleeved around an outer periphery of a rotary shaft, a plurality of chambers disposed in the main body, and damping particles filled in the chambers, wherein the chambers are disposed in the main body in a regular arrangement:

wherein the chambers are spaced with each other and arranged around the outside of the rotary shaft, the main body is concave inward from positions near both lateral end surfaces to form two layers of the chambers with the same size along an axial direction of the rotary shaft, the two layers of chambers arranged along the axial direction of the rotary shaft are symmetrical along the axial direction of the rotary shaft and mutually independent; and at least two layers of the chambers are arranged in a radial direction of the rotary shaft from inside out, the chambers of different layers have different sizes, and the chambers of an outer layer have a size greater than that of the chambers of an inner layer, the chambers can accommodate damping particles of different sizes due to different arcs and distances from an inner diameter, and the damping particle material, particle size and filling rate of the chambers of different internal space are also different.

11. The damping shock absorber according to claim 10, wherein the plurality of chambers are distributed on an outer periphery of the main body, the chambers circumferentially circulate around the outer periphery of the main body and are centrosymmetric, the damping particles contained in each chamber has the same material, particle size and filling rate.

12. The damping shock absorber according to claim 10, wherein the main body is roughly in the shape of a hoop and is detachably arranged around the rotary shaft, the main body has at least two separable hoop elements, and the hoop elements are connected to each other to form a complete main body, the hoop elements each has an arch bridge shape with hollowed inside, the arch bridge has a side cover plate, the side cover plate can be separated with the hoop element to expose the respective chambers accordingly.

13. The damping shock absorber according to claim 10, wherein the damping particles are granular material, and the granular material with a predetermined quantity is packaged by a wrapping to form a damping bag, and a plurality of the damping bag are stacked and placed in each of the chambers, the damping bags are filled with the granular material with different predetermined quantities, and the chambers are respectively used to accommodate a different number of damping bag, the wrapping is a plastic bag having a cavity for storing the granular material and a sealable opening that can be opened and closed and is an access to the cavity.

* * * * *